US012643531B2

(12) United States Patent
Kuhmann et al.

(10) Patent No.: US 12,643,531 B2
(45) Date of Patent: Jun. 2, 2026

(54) METHOD AND CONTROL UNIT FOR OPERATING A HYBRID VEHICLE

(71) Applicant: ZF Friedrichshafen AG, Friedrichshafen (DE)

(72) Inventors: Christian Kuhmann, Friedrichshafen (DE); Falko Platzer, Ravensburg (DE); Tobias Brand, Eching (DE); Florian Hannemann, Munich (DE); Alexander Jungaberle, Schlier (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 87 days.

(21) Appl. No.: 17/845,054

(22) Filed: Jun. 21, 2022

(65) Prior Publication Data

US 2023/0010451 A1     Jan. 12, 2023

(30) Foreign Application Priority Data

Jun. 21, 2021     (DE) .......................... 102021206324.1

(51) Int. Cl.
*B60W 20/40* (2016.01)
*B60W 10/06* (2006.01)
*B60W 10/08* (2006.01)

(52) U.S. Cl.
CPC ............ *B60W 20/40* (2013.01); *B60W 10/06* (2013.01); *B60W 10/08* (2013.01);
(Continued)

(58) Field of Classification Search
CPC ...... B60W 20/40; B60W 10/06; B60W 10/11;
B60W 30/19; B60W 10/02; B60W 10/026; B60W 10/08; B60W 2510/1005; B60W 2510/106; B60W 2710/0677; B60W 2510/1095; B60W 2510/107;
(Continued)

(56) References Cited

U.S. PATENT DOCUMENTS 7,289,900 B2    10/2007  Wilharm et al.
7,975,791 B2     7/2011  Nozaki et al.
(Continued)

FOREIGN PATENT DOCUMENTS

DE    112013000227 T5    7/2014
DE    102018204907 A1    10/2019
(Continued)

OTHER PUBLICATIONS

German Search Report DE 10 2021 206 324.1, dated Jan. 21, 2022. (14 pages).

*Primary Examiner* — Anne Marie Antonucci
*Assistant Examiner* — Jared C Bean
(74) *Attorney, Agent, or Firm* — Dority & Manning, P.A.

(57) ABSTRACT

A method for operating a hybrid vehicle includes, determining a shift element to be utilized for decoupling of slip and a decoupling differential speed depending on whether a starting process is carried out, depending on whether the transmission is transferred from a torque-transmitting state into a non-torque-transmitting state or from a non-torque-transmitting state into a torque-transmitting state, depending on whether a gear ratio change is carried out, and depending on whether the hybrid vehicle includes a hydrodynamic starting component.

10 Claims, 15 Drawing Sheets

(52) U.S. Cl.
  CPC . *B60W 2510/0241* (2013.01); *B60W 2510/10* (2013.01); *B60W 2710/0677* (2013.01)

(58) Field of Classification Search
  CPC ...... B60W 2510/10; B60W 2510/0241; B60K 6/387; B60K 6/26; B60K 6/48; B60K 2006/4825; B60K 2006/268; F16H 61/14; Y02T 10/62
  See application file for complete search history.

(56) References Cited

U.S. PATENT DOCUMENTS

| | | | |
|---|---|---|---|
| 8,798,838 B2 | 8/2014 | Yamanaka et al. | |
| 9,139,198 B2 * | 9/2015 | Tsuda | B60K 6/48 |
| 2014/0274554 A1 * | 9/2014 | Hess | B60W 30/18072 |
| | | | 477/77 |
| 2014/0297089 A1 * | 10/2014 | Tsuda | B60W 20/00 |
| | | | 180/65.265 |
| 2015/0375736 A1 * | 12/2015 | Kaltenbach | B60W 10/02 |
| | | | 903/910 |
| 2018/0194355 A1 * | 7/2018 | Tsuda | B60K 6/48 |
| 2020/0254991 A1 * | 8/2020 | Jungaberle | B60W 10/02 |
| 2023/0264682 A1 * | 8/2023 | Neubaur | B60W 10/08 |
| | | | 701/22 |

FOREIGN PATENT DOCUMENTS

| | | | |
|---|---|---|---|
| EP | 1792800 A2 | 6/2007 | |
| EP | 1893987 A1 | 3/2008 | |
| EP | 2669125 A1 | 12/2013 | |
| WO | WO 2006/136349 A1 | 12/2006 | |

* cited by examiner

METHOD AND CONTROL UNIT FOR OPERATING A HYBRID VEHICLE

CROSS-REFERENCE TO RELATED APPLICATION

The present application is related and claims priority to 102021206324.1 filed in the German Patent Office on Jun. 21, 2021, which is incorporated by reference in its entirety for all purposes.

FIELD OF THE INVENTION

The invention relates generally to a method for operating a hybrid vehicle. Moreover, the invention also relates generally to a control unit for operating a hybrid vehicle.

BACKGROUND

Hybrid vehicles known from practical experience include an internal combustion engine and an electric machine as prime movers. A separating clutch is connected between the internal combustion engine and the electric machine. Moreover, hybrid vehicles include a transmission, which converts rotational speeds and torques, and, in this way, provides an available tractive force of the prime movers at a driven end of the hybrid vehicle. The transmission is connected between the electric machine and the driven end. The transmission includes multiple shift elements. The shift elements of the transmission include at least multiple shift elements, which can be designed as clutches and/or brakes, and, if necessary, at least one form-locking shift element, which can be designed as a dog clutch. In every engaged gear of the transmission, a first number of shift elements is engaged and a second number of shift elements is disengaged. If a gear ratio change from a current gear into a target gear is implemented in the transmission, at least one shift element engaged in the current gear is disengaged and at least one shift element disengaged in the current gear is engaged. In the case of a hybrid vehicle, a hydrodynamic starting component can be optionally connected between the electric machine and the transmission. A hydrodynamic starting component includes a torque converter and one further shift element designed as a torque converter lockup clutch.

A hybrid vehicle can be operated in different operating modes. For example, a hybrid vehicle can be operated purely electrically when, in particular, the internal combustion engine has been shut off and decoupled from the driven end. The separating clutch connected between the internal combustion engine and the electric machine is disengaged for this purpose. Moreover, a hybrid vehicle can be operated in a hybrid manner or under internal combustion engine power, wherein, in this case, the internal combustion engine is re-started and, with the separating clutch engaged, coupled to the driven end.

In order to start the internal combustion engine during purely electric driving, the separating clutch is at least partially engaged in order to crank the internal combustion engine via the electric machine. This is referred to as drag starting the internal combustion engine. In order to ensure that the torque of the electric machine transmitted via the separating clutch during the drag starting of the internal combustion engine is not noticeable as interference torque at the driven end, it is already known to increase the torque provided by the electric machine during the drag starting of the internal combustion engine via a torque compensation.

However, since, in particular, the torque transmitted by the separating clutch during the drag starting of the internal combustion engine and the torque provided by the electric machine have a time offset and cannot be exactly set, an interference torque can form at the driven end despite the torque compensation via the electric machine. In addition, the torque actually transmitted by the separating clutch is dependent on numerous parameters, such as, for example, the friction coefficient, the delay in the hydraulic actuation, or production-induced component tolerances. Therefore, it is likewise already known to bring a shift element connected between the electric machine and the driven end into slippage during the drag starting of the internal combustion engine for the decoupling of slip of the driven end. The remaining interference torque then results only in an increase in slip or a reduction of slip and, thus, is not noticeable at the driven end.

EP 1 792 800 A2 describes a method for operating a hybrid vehicle, wherein the hybrid vehicle includes an internal combustion engine and an electric machine as prime movers. A separating clutch is connected between the internal combustion engine and the electric machine. The hybrid vehicle also includes a transmission, which is coupled between the electric machine and a driven end of the hybrid vehicle and includes multiple shift elements. It is known from EP 1 792 800 A2 to at least partially engage the separating clutch in order to start the internal combustion engine and, in this way, crank the internal combustion engine while providing a drag starting via the electric machine. It is provided to utilize such a shift element of the transmission for the decoupling of slip during the implementation of a gear ratio change in the transmission for the decoupling of slip of the driven end during the drag starting of the internal combustion engine, the aforementioned shift element being engaged both in the current gear of the gear ratio change and in the target gear of the gear ratio change, wherein this shift element is referred to as a common engaged clutch.

Accordingly, EP 1 792 800 A1 provides a drag starting of the internal combustion engine of a hybrid vehicle during the implementation of a gear ratio change in the transmission, wherein a shift element of the transmission is utilized for the decoupling of slip, which is engaged in the gears that are or will be engaged during the starting process of the internal combustion engine.

EP 1 893 987 A2 and EP 2 669 125 A1 describe further methods for operating hybrid vehicles, in order to transfer a hybrid vehicle from a purely electric operating mode into a hybrid operating mode.

There is a need to enable a comfortable drag starting of the internal combustion engine during purely electric driving in all possible operating conditions of a hybrid vehicle. A decoupling of slip of the driven end is to be always quickly and reliably providable at any time of the operation in order to enable the drag starting of the internal combustion engine via the electric machine with a high level of comfort.

SUMMARY OF THE INVENTION

Example aspects of the invention provide a new type of method and control unit for operating a hybrid vehicle.

According to example aspects of the invention, the shift element to be utilized for the decoupling of slip and the decoupling differential speed for the decoupling of slip during a drag starting of the internal combustion engine are determined depending on whether a starting process of the hybrid vehicle is carried out, and depending on whether the transmission is transferred from a torque-transmitting state into a non-torque-transmitting state or, vice versa, from a non-torque-transmitting state into a torque-transmitting state, and depending on whether a gear ratio change is carried out in the transmission, and depending on whether the hybrid vehicle includes a hydrodynamic starting component.

With the aid of example aspects of the invention, it is provided that an appropriate shift element of the hybrid vehicle is selected for the decoupling of slip and a decoupling differential speed therefor is determined depending on the configuration of the hybrid vehicle, namely depending on whether the hybrid vehicle includes a hydrodynamic starting component, and depending on whether a starting process is carried out, and depending on whether a gear ratio change is carried out in the transmission, and depending on whether a torque-transmitting state is phased in or phased out. The shift element of the hybrid vehicle to be utilized for the decoupling of slip and the appropriate decoupling differential speed are therefore determined depending on the aforementioned criteria. In this way, a comfortable drag starting of the internal combustion engine can be ensured at any time for any possible operating condition of the hybrid vehicle.

According to one example refinement, the decoupling differential speed for the decoupling of slip during a drag starting of the internal combustion engine is determined depending on a driver demand and/or depending on an oil temperature and/or depending on a gear of the transmission that is utilized for the starting process and/or on a gear of the transmission that is engaged in the torque-transmitting state of the transmission and/or on a gear of the transmission that is to be disengaged or engaged during the implementation of the gear ratio change. Further possible marginal conditions for determining the decoupling differential speed for the decoupling of slip are the mass inertia of those shafts of the transmission that are to be accelerated for the decoupling of slip of the driven end, the shift element specifically determined for the decoupling of slip, and a friction lining temperature of the shift element specifically determined for the decoupling of slip. Therefore, the decoupling differential speed can be particularly advantageously determined. Present dynamic characteristics of the vehicle open-loop control can also be utilized for determining the decoupling differential speed. The dynamic characteristics of the vehicle open-loop control can be determined, for example, on the basis of a vehicle operating mode, such as "sport", "normal", or "eco."

According to one example refinement, a decoupling differential speed specific to the particular shift element to be utilized for the decoupling of slip is determined. This permits a particularly comfortable drag starting of the internal combustion engine with the aid of the electric machine.

For the case in which a starting process of the hybrid vehicle is carried out, for the decoupling of slip, a shift element to be engaged during the starting process is preferably determined and a target starting speed is preferably adapted depending on the decoupling differential speed. This is preferred for the decoupling of slip of the driven end during the implementation of a drag starting of the internal combustion engine during a starting process of the hybrid vehicle.

For the case in which, in the torque-transmitting state of the transmission, a gear is engaged and a gear ratio change and a transfer of the transmission from the torque-transmitting state into a non-torque-transmitting state are not carried out, the torque converter lockup clutch is preferably determined for the decoupling of slip in the case of a hybrid vehicle including a hydrodynamic starting component. Depending on the present operating condition, in the case of a hybrid vehicle including a hydrodynamic starting component, a shift element of the transmission can also be determined for the decoupling of slip of the internal combustion engine start. In the case of a hybrid vehicle without a hydrodynamic starting component, a shift element of the transmission is determined for the decoupling of slip. This is preferred for the decoupling of slip of the driven end during the implementation of a drag starting of the internal combustion engine when the transmission is in a torque-transmitting state without implementing a gear ratio change and without exiting the torque-transmitting state.

For the case in which the transmission is transferred from a non-torque-transmitting state into a torque-transmitting state, initially the shift element of the transmission to be engaged first is determined for the decoupling of slip. Thereafter, in an event-controlled and/or timed manner, the shift element of the transmission determined for the decoupling of slip is the one that is determined for the decoupling of slip in the torque-transmitting state of the transmission with a fixedly engaged gear. This is preferred for the decoupling of slip of the driven end during the implementation of a drag starting of the internal combustion engine when the transmission is transferred from a non-torque-transmitting state into a torque-transmitting state while phasing in the torque transmission in the transmission, i.e., when the transmission is transferred from a transmission state Neutral N or from a transmission state Park P into a transmission state having the gear D for forward travel or the gear R for travel in reverse.

For the case in which the transmission is transferred from a torque-transmitting state into a non-torque-transmitting state, the shift element of the transmission to be disengaged first is determined for the decoupling of slip. This is preferred for the decoupling of slip of the driven end during the implementation of a drag starting of the internal combustion engine when the transmission is transferred from a torque-transmitting state into a non-torque-transmitting state, i.e., when the transmission is transferred from the gear D or from the gear R into Neutral N or into Park P.

For the case in which a gear ratio change is carried out in the torque-transmitting transmission, a check is carried out to determine whether a speed differential between a synchronous speed of the target gear of the gear ratio change and a current transmission input speed is greater than the decoupling differential speed, which is preferably dependent on the gear ratio change. For the case in which this speed differential is greater than the decoupling differential speed, the decoupling of slip takes place in a slipping phase of the gear ratio change. For the case in which this speed differential is not greater than the decoupling differential speed and the gear ratio change occurs prior to the exiting of the synchronous speed of the current gear of the gear ratio change, the torque converter lockup clutch, if present, or a shift element of the transmission to be disengaged for the gear ratio change is determined for the decoupling of slip. For the case in which this speed differential is not greater than the decoupling differential speed and the gear ratio change occurs after the exiting of synchronous speed of the current gear of the gear ratio change, the torque converter lockup clutch is determined for the decoupling of slip in a hybrid vehicle including a hydrodynamic starting component. In a hybrid vehicle without a hydrodynamic starting component, however, a shift element of the transmission to be engaged for the gear ratio change is determined for the decoupling of slip, wherein, for the case in which this shift element does not coincide with the shift element that is utilized for the decoupling of slip in the fixed gear, a transfer function is used to change to the shift element that is utilized for the decoupling of slip in the fixed gear. This is preferred for the decoupling of slip of the driven end during the implementation of a drag starting of the internal combustion engine during a starting process of the hybrid vehicle.

BRIEF DESCRIPTION OF THE DRAWINGS

Exemplary embodiments of the invention are explained in greater detail with reference to the drawing, without being limited thereto, in which.

DETAILED DESCRIPTION

Figure 1:
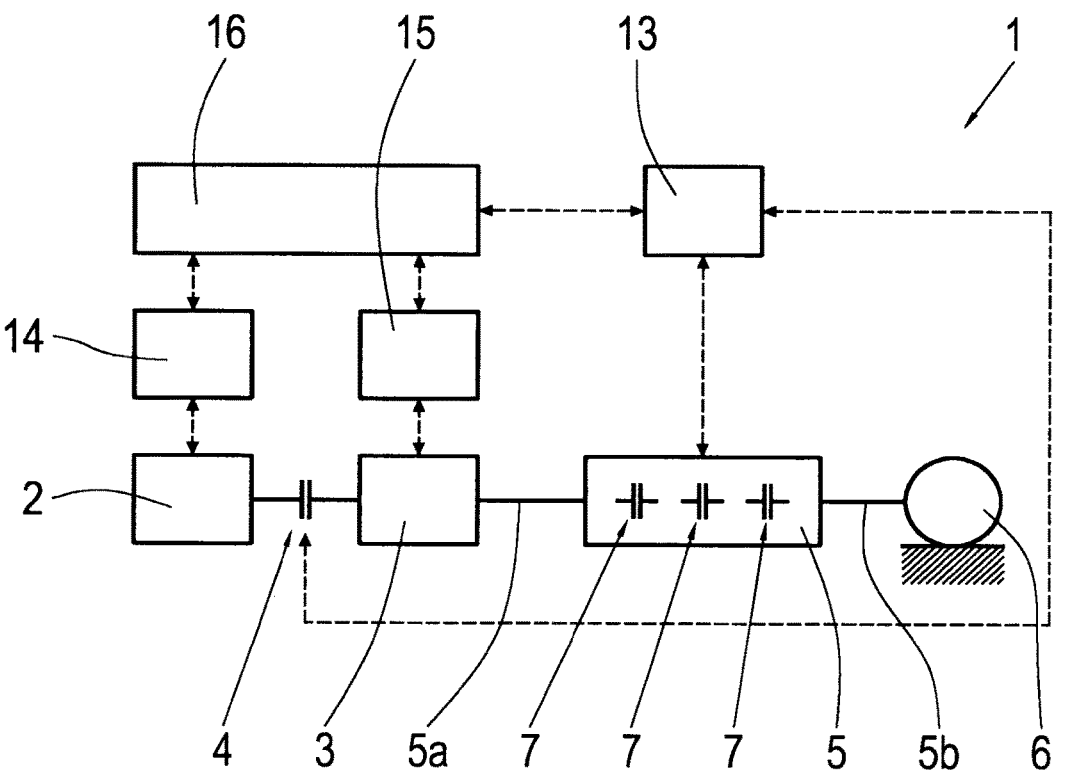
FIG. 1 shows a diagram of a drive train of a hybrid vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an exemplary diagram of a drive train 1 of a hybrid vehicle. A hybrid vehicle includes multiple prime movers, namely an electric machine 3 as a first prime mover and an internal combustion engine 2 as a second prime mover.

A separating clutch 4 is connected between the electric machine 3 and the internal combustion engine 2.

A transmission 5 is connected between the electric machine 3 and a driven end 6 of the hybrid vehicle. The transmission 5 has a transmission input 5a, a transmission output 5b, and multiple shift elements. The shift elements of the transmission 5 include at least multiple shift elements 7, which can be designed as clutches and/or brakes, and, if necessary, at least one form-locking shift element (not shown), which can be designed as a dog. FIG. 1 shows, by way of example, three shift elements 7 of the transmission 5.

For the case in which the separating clutch 4 is disengaged, the internal combustion engine 2 is decoupled from the electric machine 3, from the transmission 5, and from the driven end 6. In this case, when a torque-transmitting gear is engaged in the transmission 5, drive torque can be provided at the driven end 6 exclusively starting from the electric machine 3. With the separating clutch 4 disengaged, the internal combustion engine 2 can run or be shut off. For the case in which the drive train 1 from FIG. 1 is operated with the separating clutch 4 disengaged and the internal combustion engine 2 shut off, the condition of a purely electric operation is present. For the case in which the internal combustion engine 2 runs with the separating clutch 4 disengaged, for example, a generator (not shown) can be driven and/or an electrical energy store (not shown) can be charged. However, travel also takes place purely electrically and drive torque is provided purely electrically at the driven end 6.

For the case in which the separating clutch 4 is engaged, the internal combustion engine 2 is coupled to the driven end 6. For the case in which a torque-transmitting gear is engaged in the transmission 5, drive torque can be provided at the driven end 6 starting from the electric machine 3 and starting from the internal combustion engine 2.

Figure 2:
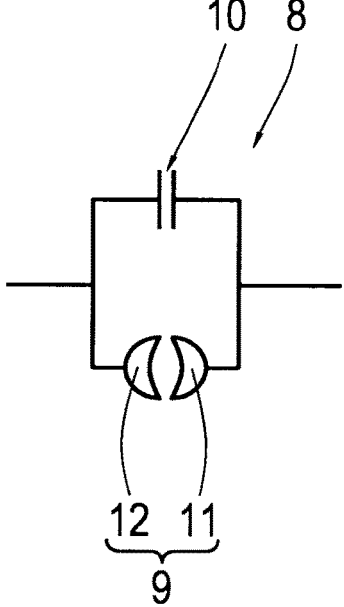
FIG. 2 shows a hydrodynamic starting component as an optional addition to the hybrid vehicle from FIG. 1.

Optionally, a hydrodynamic starting component 8 can be connected between the electric machine 3 and the transmission input 5a of the transmission 5. FIG. 2 shows a hydrodynamic starting component 8 of this type, which includes a torque converter 9 and a torque converter lockup clutch 10. For the case in which the hybrid vehicle from FIG. 1 includes the hydrodynamic starting component 8 from FIG. 2, the torque converter lockup clutch 10 forms one further shift element of the hybrid vehicle. The torque converter 9 includes a turbine wheel 11 and an impeller 12. The turbine wheel 11 is coupled to the transmission input 5a of the transmission 5 and the impeller 12 is coupled to the electric machine 3.

FIG. 1 also shows control-side assemblies, such as a transmission control unit 13, which controls the operation of the transmission 5 by way of an open-loop and/or closed-loop system. In particular, the transmission control unit 13 actuates the shift elements 7 of the transmission 5. For this purpose, the transmission control unit 13 exchanges data with the transmission 5 as indicated by the double arrow shown.

The separating clutch 4 connected between the internal combustion engine 2 and the electric machine 3 can also be actuated via the transmission control unit 13.

For the case in which the hybrid vehicle includes a hydrodynamic starting component 8, the torque converter lockup clutch 10 can also be actuated via the transmission control unit 13.

The operation of the internal combustion engine 2 of the hybrid vehicle is controlled by an internal combustion engine control unit 14 by way of an open-loop and/or closed-loop system. The operation of the electric machine 3 of the hybrid vehicle is controlled by an electric machine control unit 15 by way of an open-loop and/or closed-loop system. For this purpose, the internal combustion engine control unit 14 exchanges data with the internal combustion engine 2 and the electric machine control unit 15 exchanges data with the electric machine 3, as indicated by the dashed-line arrows in both cases.

Likewise, the internal combustion engine control unit 14 and the electric machine control unit 15 exchange data with a hybrid control unit 16. In addition, the hybrid control unit 16 exchanges data with the transmission control unit 13.

The transmission control unit 13 can also communicate directly with the electric machine control unit 15. A direct data exchange can also take place between the internal combustion engine control unit 14 and the electric machine control unit 15.

The hybrid control unit 16 can be an integral part, on the hardware side, of the internal combustion engine control unit 14. It is possible, however, that the hybrid control unit 16 is an integral part, on the hardware side, of the transmission control unit 13.

The hybrid control unit 16 controls, by way of an open-loop and/or closed-loop system, in particular, a torque output from the internal combustion engine 2 and the electric machine 3. The transmission control unit 13 controls, by way of an open-loop and/or closed-loop system, in particular, the operation of the transmission 5 and of the separating clutch 4 and, if necessary, of the torque converter lockup clutch 10.

Although this system architecture of the control units 13, 14, 15, and 16 is preferred, another control-side system architecture can also be implemented.

Example aspects of the invention relate to enabling, in the case of a hybrid vehicle, a comfortable re-starting of the internal combustion engine 2 as drag starting in all operating conditions of the hybrid vehicle during a purely electric operation in which the internal combustion engine 2 is shut off and decoupled from the driven end 6 with the separating clutch 4 disengaged, i.e., by at least partially engaging the separating clutch 4 in order to crank the internal combustion engine 2 via the electric machine 3 in order to start the internal combustion engine 2.

In such a drag starting of the internal combustion engine 2, torque provided by the electric machine 3 is transmitted via the separating clutch 4 in order to crank the internal combustion engine 2, wherein, in order to compensate for the torque transmitted via the separating clutch 4, the torque provided by the electric machine 3 is increased and, in fact, in the sense of a torque compensation. Moreover, a shift element of the hybrid vehicle for the decoupling of slip connected between the electric machine 3 and the driven end 6 is brought into slippage with a defined decoupling differential speed such that an interference torque that may be forming despite torque compensation is not noticeable at the driven end 6.

For this purpose, it is provided according to example aspects of the invention that the shift element 7, 10 of the hybrid vehicle to be utilized for the decoupling of slip and a decoupling differential speed for the decoupling of slip during drag starting of the internal combustion engine 2 are determined, namely for the shift element 7, 10 to be utilized for the decoupling of slip, depending on whether a starting process of the hybrid vehicle is carried out, and depending on whether the transmission 5 is transferred from a torque-transmitting state into a non-torque-transmitting state or, vice versa, from a non-torque-transmitting state into a torque-transmitting state, and depending on whether a gear ratio change is carried out in the transmission 5, and depending on whether the hybrid vehicle includes a hydro-dynamic starting component 8.

The decoupling differential speed for the decoupling of slip during drag starting of the internal combustion engine 2 and, thus, the decoupling differential speed for the shift element 7, 10 to be utilized for the decoupling of slip is preferably determined depending on a driver demand, and/or depending on an oil temperature, and/or depending on the gear of the transmission 5 that is utilized for the starting process, or depending on the gear of the transmission 5 that is engaged in the torque-transmitting state of the transmission 5 or is to be disengaged in order to exit the torque-transmitting state or is to be engaged in order to achieve the torque-transmitting state, or depending on the gear of the transmission 5 that is to be disengaged and/or engaged during the implementation of the gear ratio change. Further possible marginal conditions for determining the decoupling differential speed are the mass inertia of those shafts of the transmission 5 which are to be accelerated for the decoupling of slip of the driven end 6, the shift element 7, 10 specifically determined for the decoupling of slip, and a friction lining temperature of the shift element 7, 10 specifically determined for the decoupling of slip.

A decoupling differential speed specific to the particular shift element 7, 10 to be utilized for the decoupling of slip is preferably determined. The decoupling differential speed for a shift element 7 of the transmission 5 is preferably relative to the transmission input 5*a*. The ascertained decoupling differential speed can be identical for the shift elements of the transmission, however.

Further example details of the invention are described in the following with reference to the signal flow charts from FIGS. 3 through 11 and to the time-dependency diagrams from FIGS. 12 through 17.

Figure 3:
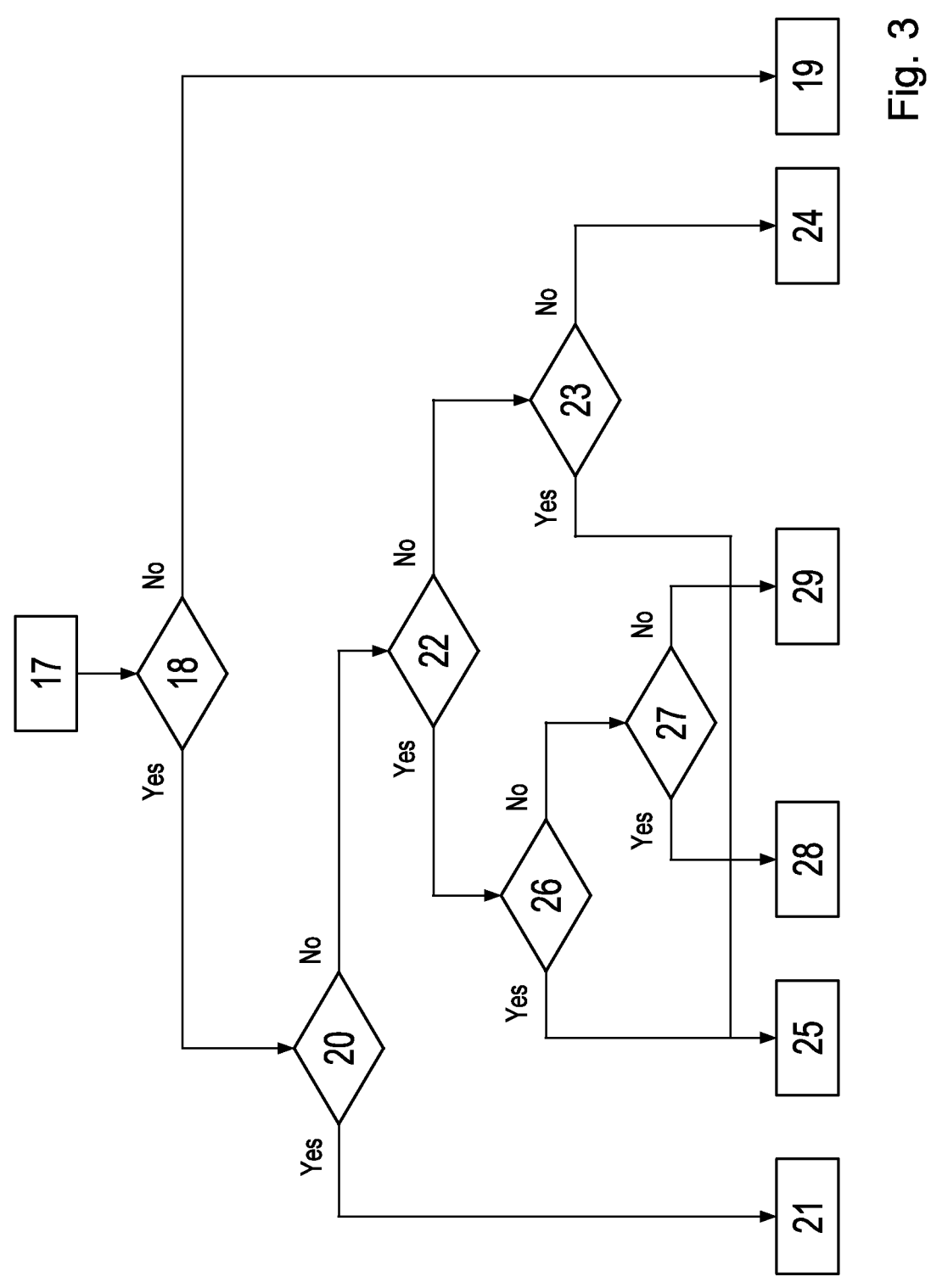
FIG. 3 shows a signal flow chart for illustrating the method according to example aspects of the invention for operating a hybrid vehicle.

FIG. 3 shows a signal flow chart, which shows the basic structure for determining the shift element to be utilized for the decoupling of slip during drag starting upon execution of the method according to example aspects of the invention. In a start block 17, the method is started, wherein, after the start of the method, a check is carried out in a block 18 to determine whether a drag starting of the internal combustion engine 2 with a decoupling of slip is requested or not. If it is established in block 18 that drag starting of the internal combustion engine 2 with a decoupling of slip is not requested, the method branches from block 18 to an end block 19 and the method is terminated. However, if it is established in block 18 that drag starting of the internal combustion engine 2 with a decoupling of slip is requested, the method branches from block 18 to block 20.

In block 20, a check is carried out to determine whether a starting process of the hybrid vehicle is carried out. If it is established that a starting process of the hybrid vehicle is being carried out, the method branches from block 20 to block 21, wherein block 21 relates to functionalities for the decoupling of slip during drag starting of the internal combustion engine 2 during a starting process of the hybrid vehicle. Functionalities of block 21 from FIG. 3 are represented in greater detail in FIG. 4.

Figure 5:
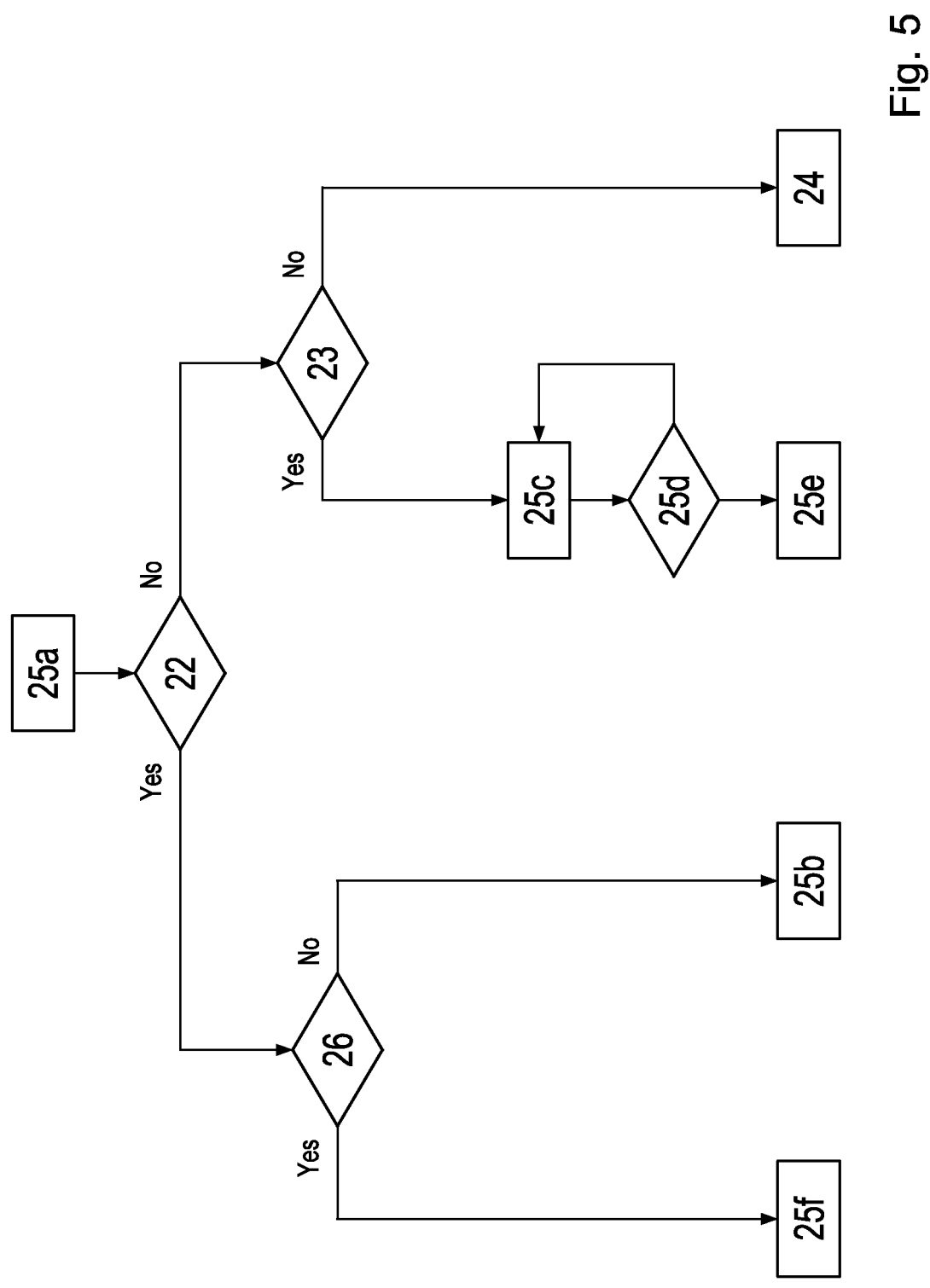
FIG. 5 shows a signal flow chart for a further detail from FIG. 2.

If it is established in block 20 that a starting process of the hybrid vehicle is not being carried out, the method branches from block 20 to block 22, wherein a check is carried out in block 22 to determine whether a torque-transmitting state is present in the transmission 5. If it is established in block 22 that a torque-transmitting state is not present, the method branches from block 22 to block 23 and a check is carried out to determine whether the transmission 5 is to be transferred from the non-torque-transmitting state into a torque-transmitting state. If it is established in block 23 that this is not the case, i.e., the transmission 5 is to remain in the non-torque transmitting state, the method branches from block 23 to block 24, wherein block 24 relates to functionalities for the decoupling of slip of the hybrid vehicle during the drag starting of the internal combustion engine 2 while the transmission is in the non-torque-transmitting state. Functionalities of block 24 are also represented in FIG. 5.

If it is established in block 23, however, that the transmission 5 is transferred from the non-torque-transmitting state into a torque-transmitting state, the method branches from block 23 to block 25. Block 25 relates to functionalities of the decoupling of slip during the drag starting of the internal combustion engine 2 for the case of transferring the transmission 5 from the non-torque-transmitting state into a torque-transmitting state. Functionalities of block 25 from FIG. 3 are represented in greater detail in FIG. 5.

The method can also branch to block 25 for the case in which it is established in block 22 that a transmission of torque is present in the transmission 5 and when it is then subsequently established in block 26 that the transmission 5 is to be transferred from the torque-transmitting state into a non-torque-transmitting state.

If it is established in block 22 that a transmission of torque is present in the transmission 5, the method branches from block 22 to block 26, wherein a check is carried out in block 26 to determine whether the transmission is to be transferred from the torque-transmitting state into a non-torque-transmitting state and, if it is established that this is the case, the method branches from block 26 to block 25. Thus, block 25 not only includes functionalities for the decoupling of slip during drag starting of the internal combustion engine 2 for the case in which the transmission 5 is to be transferred from a non-torque-transmitting state into a torque-transmitting state, but rather also for the case in which the transmission 5 is to be transferred from a torque-transmitting state into a non-torque-transmitting state.

If it is established in block 26 that, while the transmission 5 is in the torque-transmitting state, the transmission 5 is not to be transferred from the torque-transmitting state into a non-torque-transmitting state, the method branches from block 26 to block 27, wherein a check is carried out in block 27 to determine whether a gear ratio change is carried out in the torque-transmitting transmission 5. If this is the case, the method branches from block 27 to block 28, wherein block 28 includes functionalities for the decoupling of slip during the drag starting of the internal combustion engine 2 for the case in which a gear ratio change is carried out in the transmission 5. Functionalities of block 28 from FIG. 3 are shown in greater detail in FIG. 6.

If it is established in block 27 that a gear ratio change is not carried out while the transmission 5 is in the torque-transmitting state, the method branches from block 27 to block 29, wherein block 29 includes functionalities for the decoupling of slip during the drag starting of the internal combustion engine 2 for the case of a torque-transmitting transmission 5 having a fixedly engaged gear that is not to be changed. Functionalities of block 29 from FIG. 3 are shown in greater detail in FIG. 7.

Figure 4:
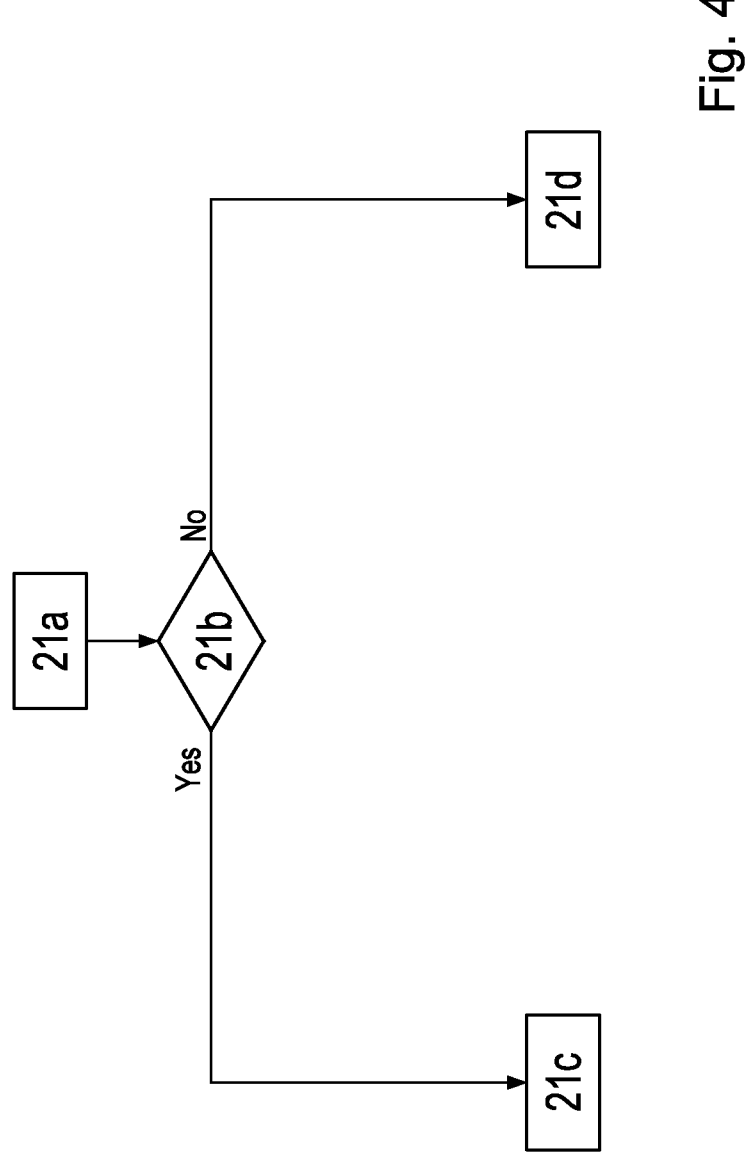
FIG. 4 shows a signal flow chart for a detail from FIG. 2.
Figure 7:
FIG. 7 shows a signal flow chart for a further detail from FIG. 2.
Figure 8:
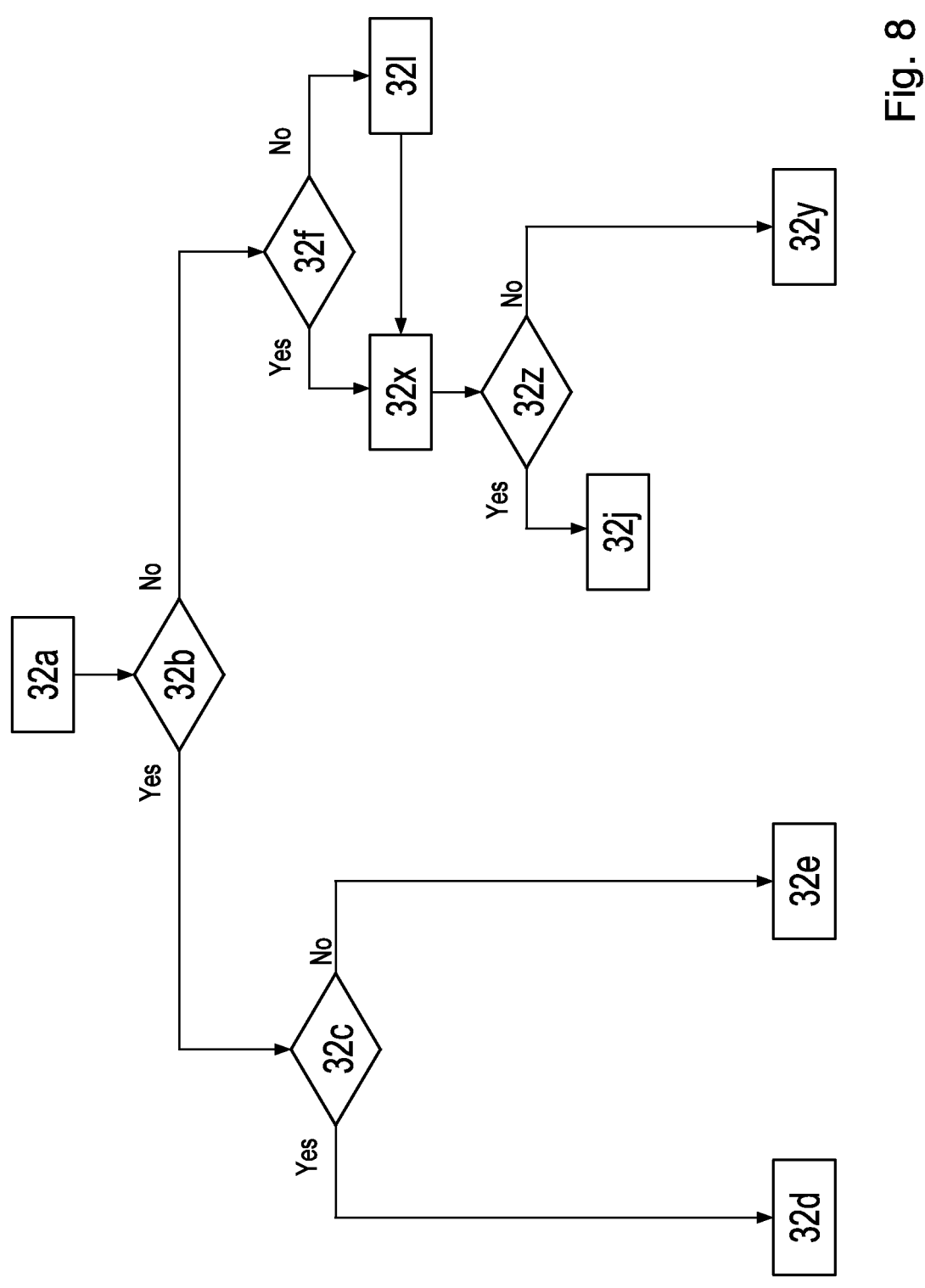
FIG. 8 shows a signal flow chart for a detail from FIG. 7.
Figure 10:
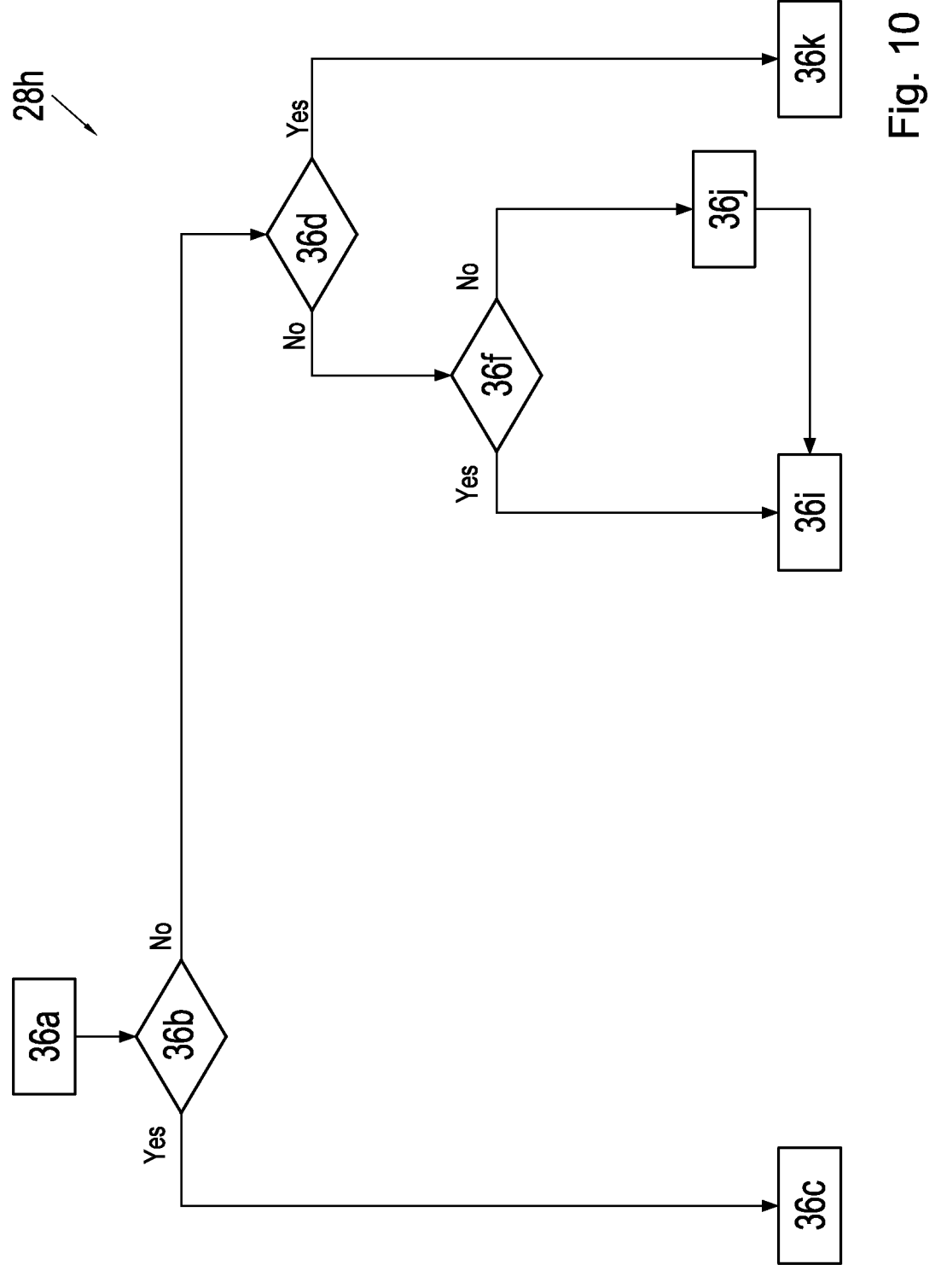
FIG. 10 shows a signal flow chart for a detail from FIG. 6.

Functionalities of block 21 are shown in greater detail in FIG. 4. Functionalities of blocks 24, 25 are shown in greater detail in FIG. 5. Functionalities of block 28 are shown in greater detail in FIG. 6. Functionalities of block 29 are shown in greater detail in FIG. 7. FIG. 8 visualizes a detail from FIG. 7. FIG. 10 visualizes a detail from FIG. 6.

Figure 9:
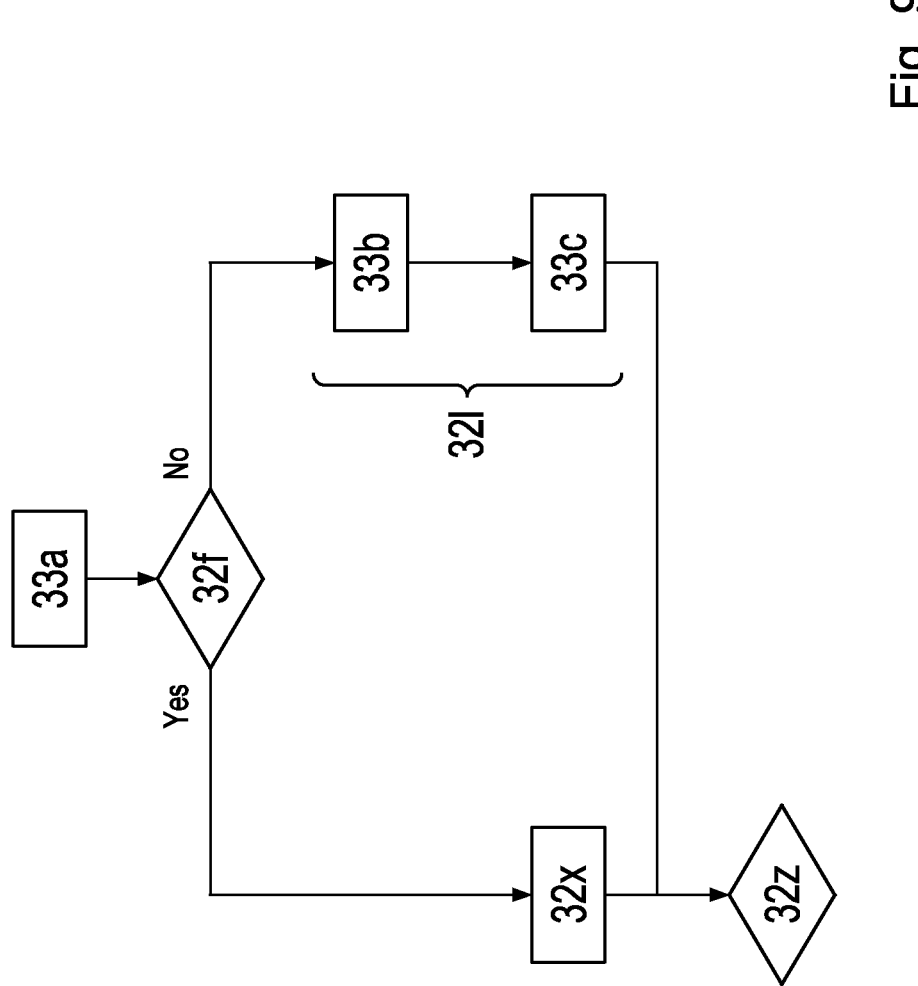
FIG. 9 shows a signal flow chart for a detail from FIG. 8.
Figure 11:
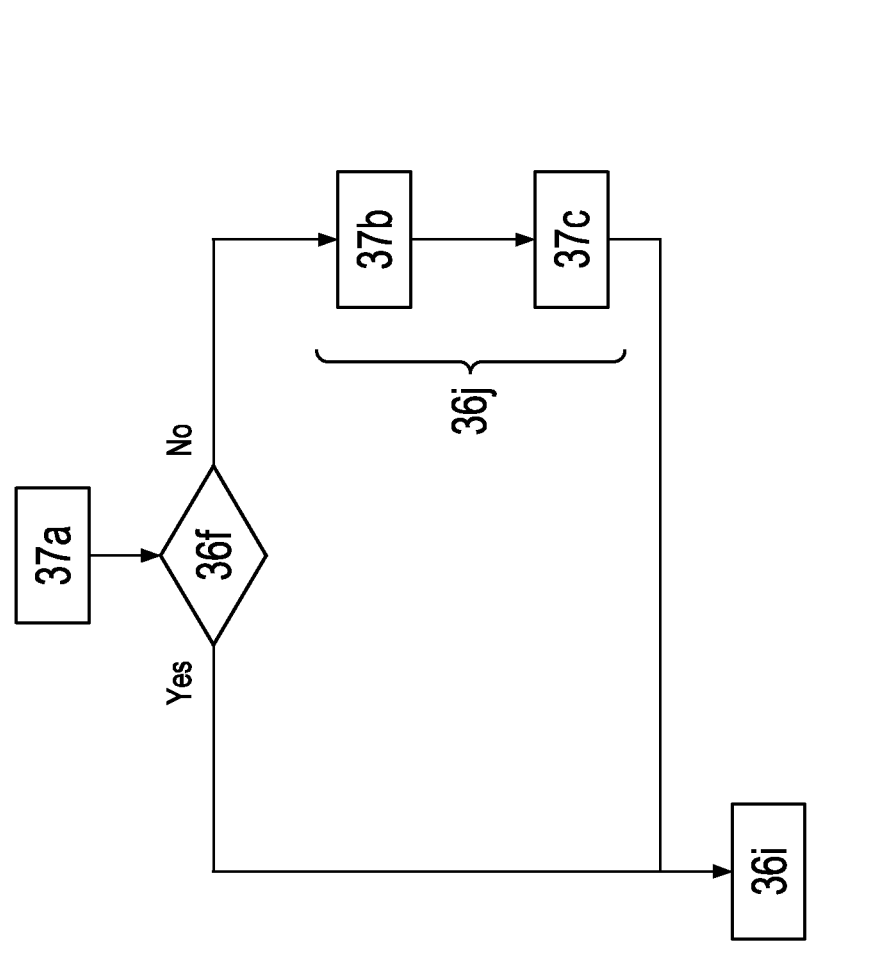
FIG. 11 shows a signal flow chart for a detail from FIG. 10.

FIGS. 9 and 11 illustrate details from FIGS. 8 and 10, namely of a transfer function for the change of a shift element determined for the decoupling of slip.

For the case in which the method in the signal flow chart from FIG. 3 branches to block 21, i.e., a decoupling of slip is requested during drag starting of the internal combustion engine 2 and upon execution of a starting process of the hybrid vehicle, a check is carried out in block 21 according to FIG. 4—in a block 21b after a start block 21a—to determine whether the decoupling functionality is requested or active for the drag starting of the internal combustion engine 2 during a starting process of the hybrid vehicle, wherein, when this is the case, the method branches from block 21b to block 21c. If this is not the case, however, the method branches from block 21b to the end block 21d and the block 21 is terminated.

Block 21c from FIG. 4 includes the actual functionalities for the decoupling of slip during drag starting of the internal combustion engine 2 and during a starting process of the hybrid vehicle, wherein, in block 21c, a shift element of the hybrid vehicle to be engaged during the starting process for the decoupling of slip is determined, wherein this shift element can be a shift element 7 of the transmission 5 as well as the torque converter lockup clutch 10 of the hydrodynamic starting component 8.

In the case of a hybrid vehicle without a hydrodynamic starting component 8, in block 21c, a shift element 7 of the transmission 5 to be engaged for the starting process is preferably determined as the slip decoupling shift element and, in the case of a hybrid vehicle including a hydrodynamic starting component 8, the torque converter lockup clutch 10 is preferably determined as the slip decoupling shift element.

Moreover, in block 21c, a decoupling differential speed is determined for the particular shift element 7, 10 to be utilized for the decoupling of slip during drag starting of the internal combustion engine 2. The decoupling differential speed is then taken into account in a target starting speed during the starting process. Preferably, the target starting speed is increased depending on the decoupling differential speed.

The decoupling differential speed to be determined is stored in the transmission control unit 13 and applied on the control side. The decoupling differential speed is preferably dependent on a driver demand and/or dependent on an oil temperature of the transmission 5 or of the hydrodynamic starting component 8 and/or dependent on the gear that is utilized for pulling away from rest, i.e., on a starting gear. Therefore, a defined decoupling differential speed can be determined for the shift element to be utilized for the decoupling of slip depending on the oil temperature, depending on the starting torque demanded by the driver, and depending on the starting gear. With respect to a shift element 7 of the transmission 5, the decoupling differential speed is preferably relative to the rotational speed at the transmission input 5a.

Figure 14:
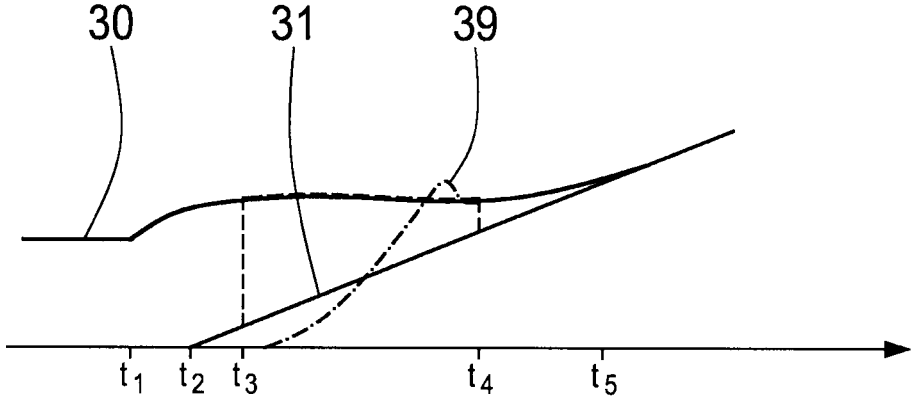
FIG. 14 shows a time-dependency diagram with further rotational speed profiles.

FIG. 14 shows rotational speed profiles with respect to time, which can form during the starting process of the hybrid vehicle upon the decoupling of slip during drag starting of the internal combustion engine 2. The curve profile 30 shows a temporal sequence of the rotational speed of the electric machine 3 and the curve profile 31 shows the temporal sequence of the driven end 6 multiplied by the present ratio of the transmission 5, and the curve profile 39 shows the rotational speed of the internal combustion engine 2. At the point in time t1, the rotational speed of the electric machine 3 is increased. The starting process of the motor vehicle begins at the point in time t2, in that the driven end 6 assumes a rotational speed. At the point in time t3, the engagement process of the separating clutch 4 is started, and so the internal combustion engine 2 is accelerated to a starting speed and started. After the start has been carried out, the rotational speed of the internal combustion engine 2 is initially set above the present rotational speed of the electric machine 2 and subsequently synchronized therewith by the point in time t4. Thereupon, the decoupling of slip is phased out up to the point in time t5.

FIG. 5 illustrates, in greater detail, the interaction of blocks 24 and 25 from FIG. 3. FIG. 5 visualizes the functionalities for the decoupling of slip during drag starting of the internal combustion engine 2 for the case in which the transmission 5 is transferred from a torque-transmitting state, for example, the gear D for forward travel or the gear R for travel in reverse, into a non-torque-transmitting state, for example, into neutral N or park P, or for the case in which the transmission 5 is transferred from a non-torque-trans-mitting state into a torque-transmitting state, or in which the transmission 5, which is in a non-torque-transmitting state, remains in the non-torque transmitting state.

Thus, FIG. 5 shows a start block 25*a* and the blocks 22, 23, and 26 from FIG. 3, wherein a check is carried out in block 22 to determine whether the transmission 5 is in the torque-transmitting state, wherein a check is carried out in block 23 to determine whether the non-torque-transmitting transmission 5 is to be transferred into a non-torque-transmitting state, and wherein a check is carried out in block 26 to determine whether the torque-transmitting transmission 5 is to be transferred into a non-torque-transmitting state.

If it is established in block 26 that the transmission 5 is to be transferred from a torque-transmitting state into a non-torque-transmitting state, the method branches to block 25*f*, wherein, in block 25*f*, the shift element 7 of the transmission 5 to be disengaged first when the transmission 5 is transferred into the non-torque-transmitting state is determined for the purpose of decoupling slip during drag starting of the internal combustion engine 2 and during the transfer of the transmission 5 into the non-torque-transmitting state. A decoupling differential speed is determined for this shift element 7 of the transmission 5 to be disengaged first, which can be dependent on the driver demand and/or the oil temperature and/or dependent on the gear of the transmission 5 to be disengaged. If it is established in block 23 that the non-torque-transmitting transmission 5 remains in the non-torque-transmitting state, the method branches to block 24, wherein the decoupling of slip during drag starting of the internal combustion engine 2 is then ensured due to the transmission 5 being in the non-torque-transmitting state and remaining in the non-torque-transmitting state. No further measures are then necessary for the decoupling of slip, since the transmission 5 in block 24 is non-torque-transmitting. If it is established in block 26 that the transmission 5 is to be transferred from a torque-transmitting state into a non-torque-transmitting state, the method branches from block 26 to the end block 25*b*.

If it is established in block 23 that the non-torque-transmitting transmission 5 is to be transferred into a torque-transmitting state, in FIG. 5, the method branches from block 23 to a block 25*c*, wherein, in block 25*c*, the shift element 7 of the transmission for the decoupling of slip to be engaged first in order to establish the torque-transmitting state in the particular gear of the transmission 5 and a decoupling differential speed therefor are determined for the purpose of decoupling slip during drag starting of the internal combustion engine 2.

A check is then carried out in a subsequent block 25*d* to determine whether the gear in the transmission 5 to be engaged in order to establish the torque transmission has been engaged and/or whether a defined period of time has elapsed. If it is established in block 25*d* that the gear in the transmission 5 to be engaged in order to phase in the torque transmission has not yet been engaged and that the defined period of time has not yet elapsed, the method branches from block 25*d* back to block 25*c*. However, for the case in which it is established in block 25*d* that the gear in the transmission 5 to be engaged in order to phase in the torque transmission has been engaged and/or that the defined period of time has elapsed, the method branches from block 25*d* to block 25*e*, wherein, in block 25*e*, the method transfers to the block 29 from FIG. 3, which relates to the decoupling of slip when the transmission 5 is in a torque-transmitting state and a gear is fixedly engaged.

As mentioned above, FIG. 7 visualizes details of the block 29, i.e., functional details for the decoupling of slip during drag starting of the internal combustion engine 2 for the case in which the transmission 5 is in a torque-transmitting state with a fixedly engaged gear and a gear ratio change is not carried out. In FIG. 7, a block 29*a* visualizes a start block, wherein a check is carried out in block 29*b* to determine whether the decoupling function for the drag starting of the internal combustion engine 2 is requested in the case of a torque-transmitting transmission 5 with a fixedly engaged gear. If it is established in block 29*b* that this is not the case, the method branches from block 29*b* to the end block 29*c*.

However, if it is established in block 29*b* that the decoupling function is active and requested for the torque-transmitting transmission 5 with a fixedly engaged gear, the method branches from block 29*b* to block 29*d*, wherein a check is carried out in block 29*d* to determine whether the configuration of the hybrid vehicle includes a hydrodynamic starting component 8 or not. If it is established in block 29*d* that the hybrid vehicle includes a hydrodynamic starting component 8, the method branches from block 29*d* to block 29*e*. In block 29*e*, the torque converter lockup clutch 10 of the hydrodynamic starting component 8 is then determined for the decoupling of slip for the drag starting of the internal combustion engine 2, and a defined decoupling differential speed therefor is determined, preferably depending on the driver demand and/or depending on the oil temperature. The decoupling differential speed is then provided via the slip of the torque converter lockup clutch 10.

However, if it is determined in block 29*d* that the hybrid vehicle does not include a hydrodynamic starting component 8, the method branches from block 29*d* to block 29*f* and a shift element 7 of the transmission 5 is determined for the decoupling of slip for the drag starting of the internal combustion engine 2. The shift element 7 is to be brought into slippage in the particular engaged gear of the transmission 5. A decoupling differential speed is then determined for this shift element 7, which is preferably dependent on the driver demand and/or dependent on the oil temperature of the transmission and/or dependent on the gear engaged in the transmission 5 and the shift element 7 of the transmission 5 to be disengaged.

Subsequent to the block 29*f*, a check is carried out in a block 29*g* to determine whether a gear ratio change is to be carried out in the transmission 5 and/or whether the torque-transmitting transmission 5 is to be transferred into a non-torque-transmitting state. If this is not the case, the method branches from block 29*g* back to block 29*f*. If this is the case, however, the method branches from the block 29*g* to block 29*h*. If it is established in block 29*g* that the torque-transmitting transmission is to be transferred into a non-torque-transmitting state, the block 29*h* transfers the decoupling functionality of the block 29 to the block 25 from FIG.

5. However, if it is established in block 29g that, in the case of a torque-transmitting transmission 5, a gear ratio change is to be carried out in the transmission 5, the block 29h transfers the decoupling functionality from block 29 to the signal flow chart from FIG. 8.

In the signal flow chart from FIG. 8, a block 32a visualizes a start block for the functionality from FIG. 8. The decision of the subsequent block 32b depends on whether the hybrid vehicle includes a hydrodynamic starting component 8. If the hybrid vehicle includes the hydrodynamic starting component 8, the method branches from block 32b to block 32c, wherein a check is carried out in block 32c to determine whether a speed differential between the synchronous speed of the target gear of the gear ratio change to be carried out and the current transmission input speed at the transmission input 5a is greater than a decoupling differential speed, which is preferably dependent on the gear ratio change. If this is the case, the method branches from block 32c to block 32d, wherein block 32d then retrieves the decoupling functionalities of the block 28 from FIG. 6.

However, if it is established in block 32c that the speed differential between the synchronous speed of the target gear of the gear ratio change to be carried out and the current transmission input speed is not greater than the decoupling differential speed, the method branches from block 32c to block 32e, wherein in block 32e the hydrodynamic torque converter 10 of the hydrodynamic starting component 8 is utilized for the decoupling of slip. The decoupling differential speed is then taken into account in the slip of the torque converter lockup clutch 10.

If the hybrid vehicle does not include a hydrodynamic starting component, the method branches from block 32b to block 32f, wherein a check is carried out in block 32f to determine whether the shift element to be disengaged during the gear ratio change to be carried out would be that shift element 7 which would be determined in the present gear for a decoupling of slip of the internal combustion engine start. If this is the case, the method branches from block 32f to block 32x. Thereafter, the shift element to be disengaged during the gear ratio change to be carried out is determined as that shift element 7, by which a decoupling of slip of the internal combustion engine is carried out. If this is not the case, the transfer function according to block 32l is retrieved, which is visualized in FIG. 9. After completion of the transfer function according to block 32l, the shift element defined there is determined according to block 32x as that shift element 7, by which a decoupling of slip of the internal combustion engine start is carried out.

Figure 6:
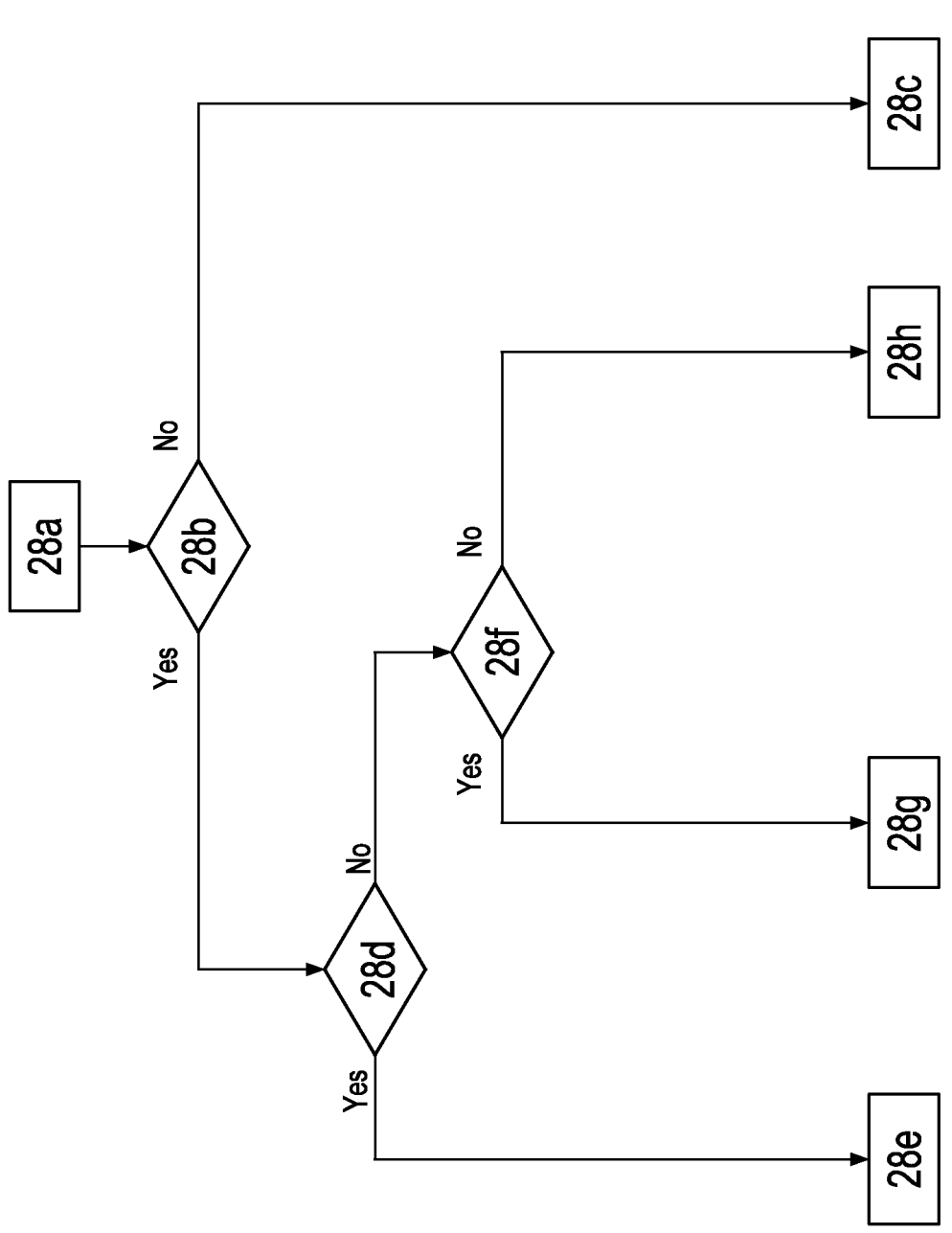
FIG. 6 shows a signal flow chart for a further detail from FIG. 2.

Starting from block 32x, a check is carried out in block 32z to determine how far along the gear shift to be implemented has already progressed. If the gear ratio change to be carried out occurs prior to the exiting of the synchronous speed of the current gear of the gear ratio change, the method branches from block 32z to the block 32j. Thereafter, the internal combustion engine start is decoupled via the shift element 7, which disengages during the gear ratio change. However, if it is established in block 32z that the gear ratio change to be carried out already occurs subsequent to the exiting of the synchronous speed of the current gear, which is to be disengaged, of the gear ratio change to be carried out, the method branches from block 32z to block 32y. Thereafter, in block 32y, the decoupling functionality of the block 28 according to FIG. 6 is retrieved.

In FIG. 9, a block 33a visualizes a start block. FIG. 9 shows the blocks 32f, 32h, and 32l from FIG. 8 once again, wherein the transfer function 32l from FIG. 8 is visualized by the blocks 33b and 33c. In block 33b, a speed differential is phased in at the shift element 7 of the transmission 5. In block 33c, a speed differential is phased out at that shift element which would be utilized, with a fixedly engaged target gear of the gear ratio change to be carried out, for the decoupling of slip during drag starting of the internal combustion engine 2. The method then branches from block 33c to block 32x and subsequently proceeds according to block 32z according to FIG. 8.

Figure 15:
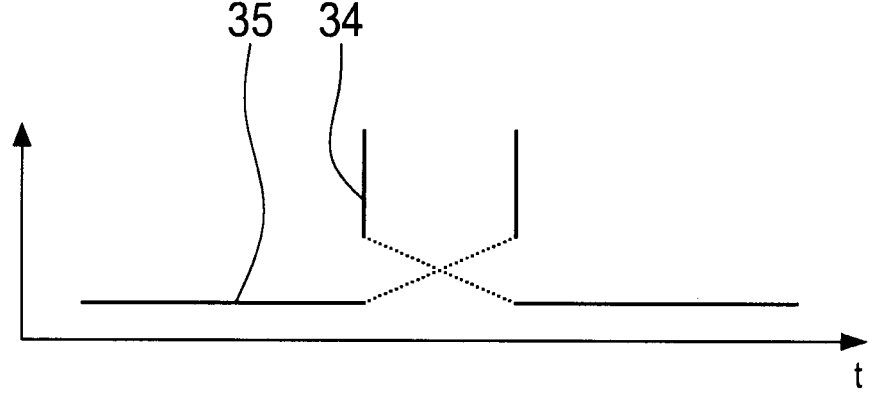
FIG. 15 shows a time-dependency diagram with pressure profiles.

FIG. 15 illustrates pressure profiles over time 34 and 35 for the shift elements 7 of the transmission 5 to be actuated in the transfer function from FIG. 9 in the blocks 33b and 33c, wherein the signal curve 34 corresponds to the phasing-in of a differential speed at a shift element 7 of the transmission 5 in block 33b and the signal curve 35 corresponds to the phasing-out of a differential speed at a shift element 7 of the transmission 5 in block 33c. In order to phase in a differential speed according to the pressure profile 34, the pressure control of the particular shift element 7 is reduced and, in order to phase out a differential speed at the particular shift element 7, the pressure control thereof is increased. According to FIG. 15, this is carried out in overlap and, thus, in parallel in time such that sufficient slip is always present.

As mentioned above, FIG. 6 visualizes details of the block 28, i.e., decoupling functionalities, which are to be carried out for the case in which decoupling of slip for the drag starting of the internal combustion engine 2 takes place during the implementation of a gear ratio change in the transmission 5.

A block 28a visualizes a start block, wherein a check is carried out in a block 28b to determine whether a gear ratio change is active. If it is established in the block 28b that a gear ratio change is not active, the method branches to the end block 28c from FIG. 6. However, if it is established in block 28b that a gear ratio change is active, the method branches to the block 28d from FIG. 6.

In block 28d, a check is carried out to determine whether a speed differential between the synchronous speed of the target gear of the gear ratio change to be carried out and the current rotational speed of the transmission input 5a is greater than a decoupling differential speed for the gear ratio change to be carried out. If this is the case, the decoupling can be carried out and taken into account in the slipping phase of the gear ratio change to be carried out and the method then branches from block 28d to block 28e. In this case, the decoupling differential speed is then taken into account and provided in the slipping phase of the gear ratio change to be carried out, wherein the slipping phase of the gear ratio change to be carried out is that phase of the gear ratio change to be carried out which occurs after the exiting of the synchronous speed of the current gear to be disengaged and prior to the attainment of the synchronous speed of the target gear, which is to be engaged, of the gear ratio change to be carried out.

If it is established in block 28d that the speed differential between the synchronous speed of the target gear of the gear ratio change to be carried out and the current rotational speed of the transmission input 5a is not greater than a defined decoupling differential speed, i.e., that the decoupling in the slipping phase of the gear ratio change is not sufficient, the method branches from block 28d to block 28f.

In block 28f, a check is carried out to determine whether the gear ratio change to be carried out occurs prior to the exiting of the synchronous speed of the current gear of the gear ratio change to be carried out. If this is the case, the method branches from block 28f to block 28g, wherein, in block 28g, the shift element 7 of the transmission 5 to be disengaged for the disengagement of the current gear of the gear ratio change to be carried out is determined for the decoupling of slip.

If it is established in block 28*f,* however, that the gear ratio change to be carried out has already exited the synchronous speed of the current gear, which is to be disengaged, of the gear ratio change, the method branches from block 28*f* to block 28*h,* wherein block 28*h* then retrieves and activates the functionality of the signal flow chart from FIG. 10.

In FIG. 10, a block 36*a* visualizes a start block. The selection in block 36*b* depends on whether the hybrid vehicle includes a hydrodynamic starting component 8. If the hybrid vehicle includes the hydrodynamic starting component 8, the method branches from block 36*b* to block 36*c* and the torque converter lockup clutch 10 is determined for the decoupling of slip for the drag starting of the internal combustion engine 2. The slip of the torque converter lockup clutch 10 is then taken into account for the decoupling differential speed.

If the hybrid vehicle does not include the hydrodynamic starting component 8, however, the method branches from block 36*b* to block 36*d,* wherein a check is carried out in block 36*d* to determine whether the gear ratio change to be carried out still occurs prior to the attainment of the synchronous speed of the target gear, which is to be engaged, of the gear ratio change to be carried out.

If it is established in block 36*d* that, with respect to the gear ratio change to be carried out, the synchronous speed of the target gear to be engaged has not yet been reached, the method branches from block 36*d* to the block 36*k* from FIG. 10. Thereafter, the internal combustion engine start is decoupled by the still existing slip state of the shift element 7 which is to be engaged during the gear ratio change to be carried out.

However, if it is established in block 36*d* that the gear ratio change has already reached the synchronous speed of the target gear, which is to be engaged, of the gear ratio change to be carried out, the method branches from block 36*d* to block 36*f.* A check is carried out in block 36*f* to determine whether the shift element of the transmission 5 that is to be engaged during the gear ratio change that was just carried out corresponds to that shift element 7 which would be intended for the decoupling of the internal combustion engine start in the currently engaged gear. If this is the case, the method branches from block 36*f* to block 36*i,* wherein block 36*i* retrieves the decoupling functionality for a torque-transmitting transmission with a fixedly engaged gear according to block 29 and according to FIG. 7.

If it is established in block 36*f* that the shift element of the transmission 5 that is to be engaged during the gear change operation that was just carried out does not correspond to that shift element 7 which would be intended for the decoupling of the internal combustion engine start in the currently engaged gear, the method branches from block 36*f* to block 36*j,* wherein block 36*j* relates to a transfer function for the change of the shift element 7 of the transmission 5 selected for the decoupling of slip, which is shown in greater detail in FIG. 11. After this transfer function 36*j* has been carried out, the method branches to block 36*i,* i.e., the decoupling functionality for a torque-transmitting transmission with a fixedly engaged gear according to block 29 and according to FIG. 7.

FIG. 11 shows a start block 37*a* and, once again, the blocks 36*f,* 36*i,* and 36*j* from FIG. 10, wherein the transfer functionality 36*j* is shown by the blocks 37*b* and 37*c.* In the block 37*b,* differential speed is phased in at the clutch to be engaged for the target gear to be engaged and slip is phased out at that shift element which is utilized with a fixedly engaged target gear for the decoupling of slip, wherein the method then branches from block 37*c* to block 36*i.*

Figure 12:
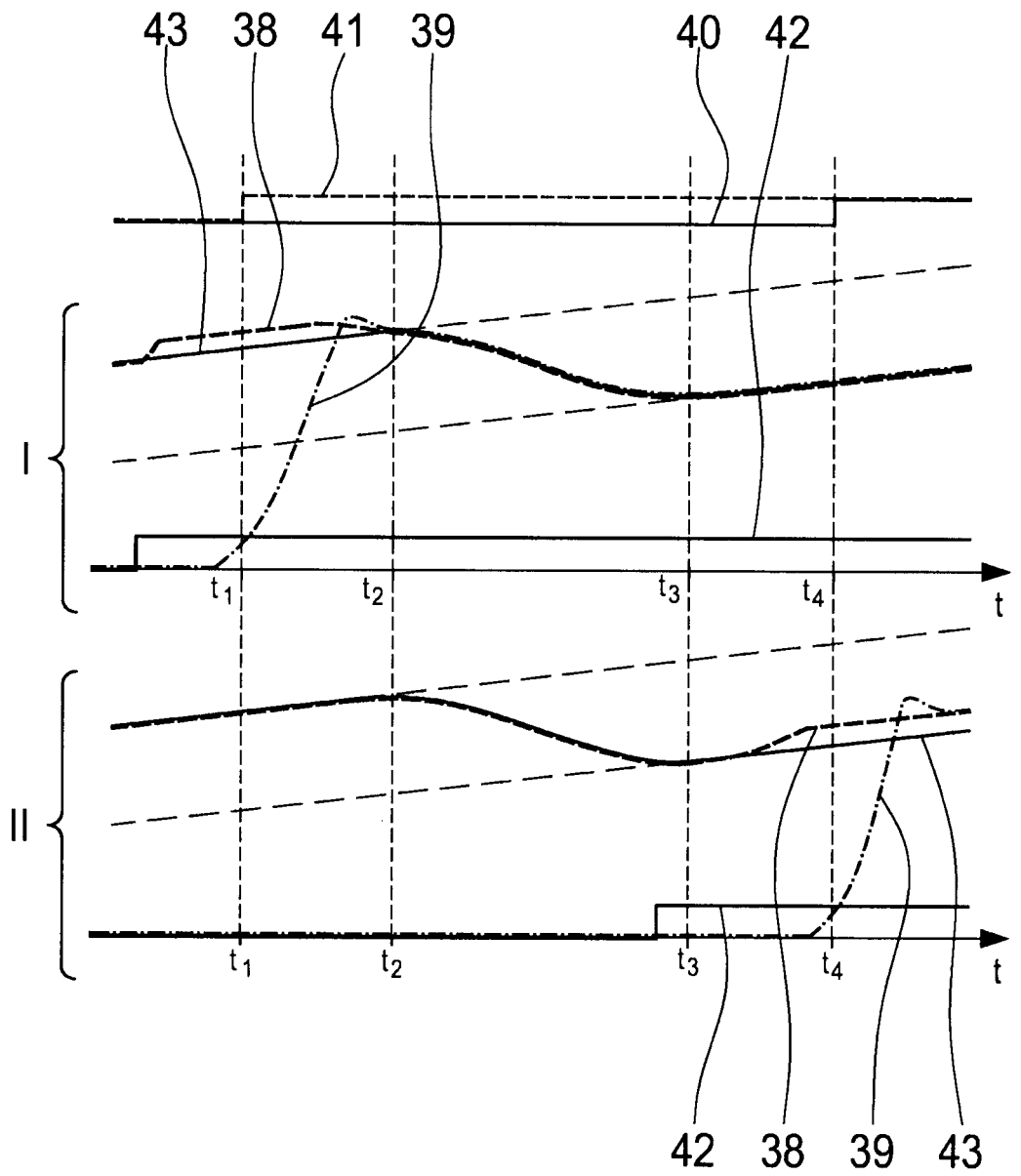
FIG. 12 shows a time-dependency diagram with rotational speed profiles.
Figure 13:
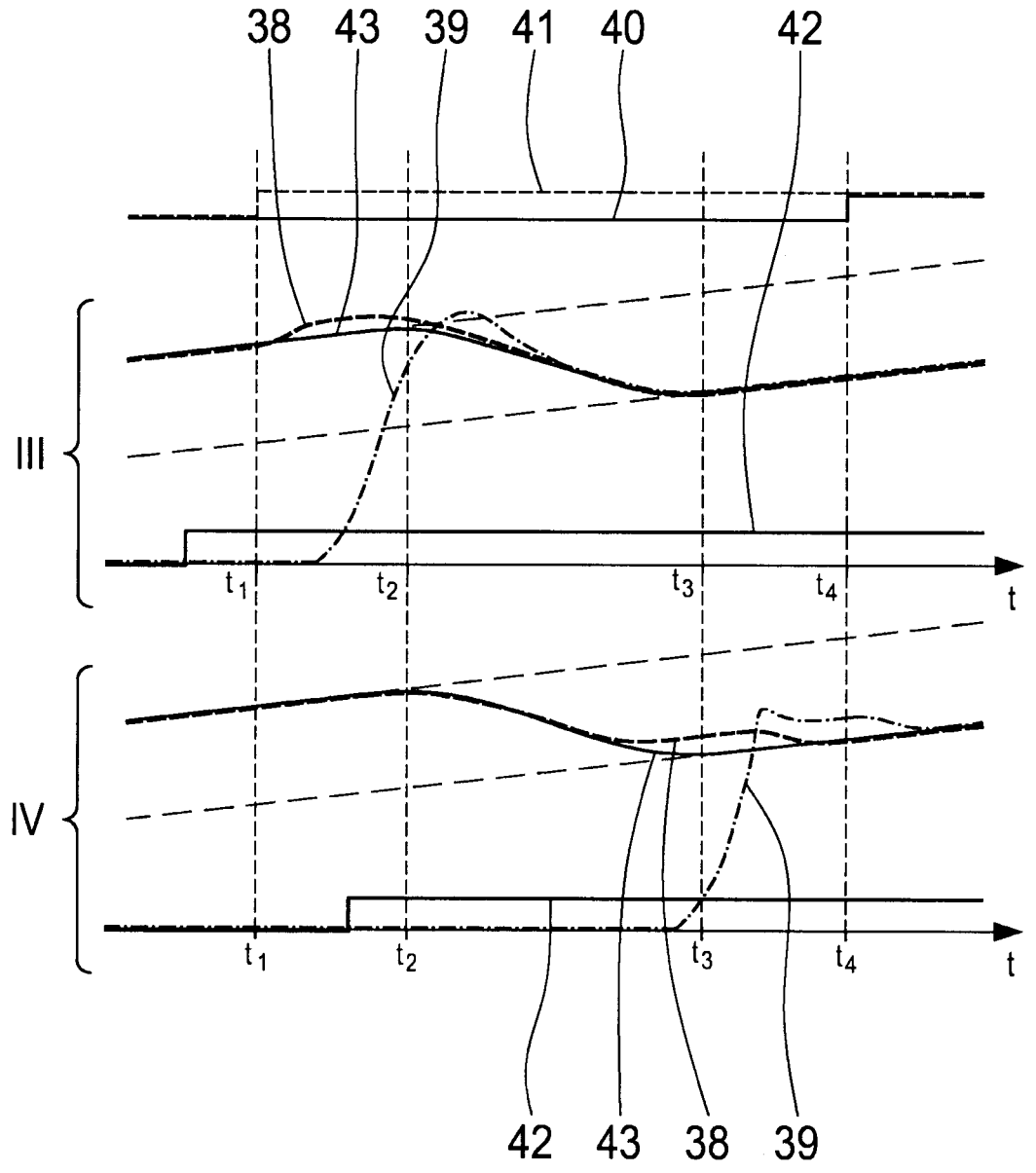
FIG. 13 shows time-dependency diagrams with further rotational speed profiles.

FIGS. 12 and 13 visualize rotational speed profiles with respect to time, which can form during the execution of the method according to example aspects of the invention, namely in the case in which the decoupling of slip for the drag starting of the internal combustion engine 2 is carried out during the implementation of a gear ratio change in the transmission 5 formed as a traction upshift.

FIGS. 12 and 13, overall, show four cases I, II, III, and IV of developing rotational speed profiles, wherein the rotational speed profiles 38 each visualize the temporal sequence of the rotational speed of the electric machine 3 and the rotational speed profiles 39 each visualize the temporal sequences of the rotational speed of the internal combustion engine 2. The rotational speed profiles 43 visualize the temporal sequences of the rotational speed of the transmission output 5*b* multiplied by the currently present ratio of the transmission 5.

In FIGS. 12 and 13, furthermore, a curve profile 40 illustrates the sequence of a current gear and the curve profile 41 illustrates the sequence of a target gear, wherein it is apparent from FIGS. 12 and 13 that the target gear begins to deviate from the current gear at the point in time t1, and so a gear ratio change is requested at the point in time t1. At the point in time t4, the current gear coincides with the target gear again, and so the gear ratio change to be carried out is completed at the point in time t4. Curve profiles 42 visualize a control-side request to start the internal combustion engine 2 via drag starting.

In the case I from FIG. 12, according to the signal curve 42, the drag starting of the internal combustion engine 2 is requested before the point in time t1, i.e., before a gear ratio change is requested at the point in time t1. Therefore, initially the decoupling functionality of the block 29 is utilized with a torque-transmitting transmission 5 and a fixedly engaged gear.

When a gear ratio change is requested at the point in time t1, a changeover to the decoupling functionality from FIG. 8 takes place, wherein, in the first case I from FIG. 12, the gear ratio change to be carried out occurs prior to the exiting of the synchronous speed of the current gear of the traction upshift to be carried out. In FIGS. 12 and 13, the synchronous speed of the current gear is exited at the point in time t2, and the synchronous speed of the target gear is reached at the point in time t3 such that the slipping phase of the gear ratio change to be carried out, namely the slipping phase of the traction upshift to be carried out, is present between the points in time t2 and t3.

In the case I from FIG. 12, the drag starting of the internal combustion engine 2 can be completed by the point in time t2, i.e., before the exiting of the synchronous speed of the current gear.

In the case II from FIG. 12, the request for the drag starting of the internal combustion engine 2 takes place immediately before the point in time t3, wherein the drag starting of the internal combustion engine 2 then takes place, via the decoupling functionalities of the blocks 36*g,* 36*h,* and 36*i,* into a fixedly engaged target gear of the traction upshift to be carried out.

While, in the cases I and II from FIG. 12, the decoupling of slip during drag starting of the internal combustion engine 2 while carrying out a traction upshift therefore takes place in a fixed gear, namely in the current gear in the case I and in the target gear of the traction upshift to be carried out in the case II, FIG. 13 shows the cases III and IV of a decoupling of slip during a drag starting with gear ratio changes formed as traction upshifts, which do not take place in a fixed gear. In the case III from FIG. 13, the shift element 7 of the transmission 5 to be disengaged for implementing the gear ratio change, namely the traction upshift, is utilized for the decoupling of slip and, in the case IV from FIG. 13, the shift element 7 of the transmission 5 to be engaged for implementing the gear ratio change, namely the traction upshift, is utilized for the decoupling of slip.

Figure 16:
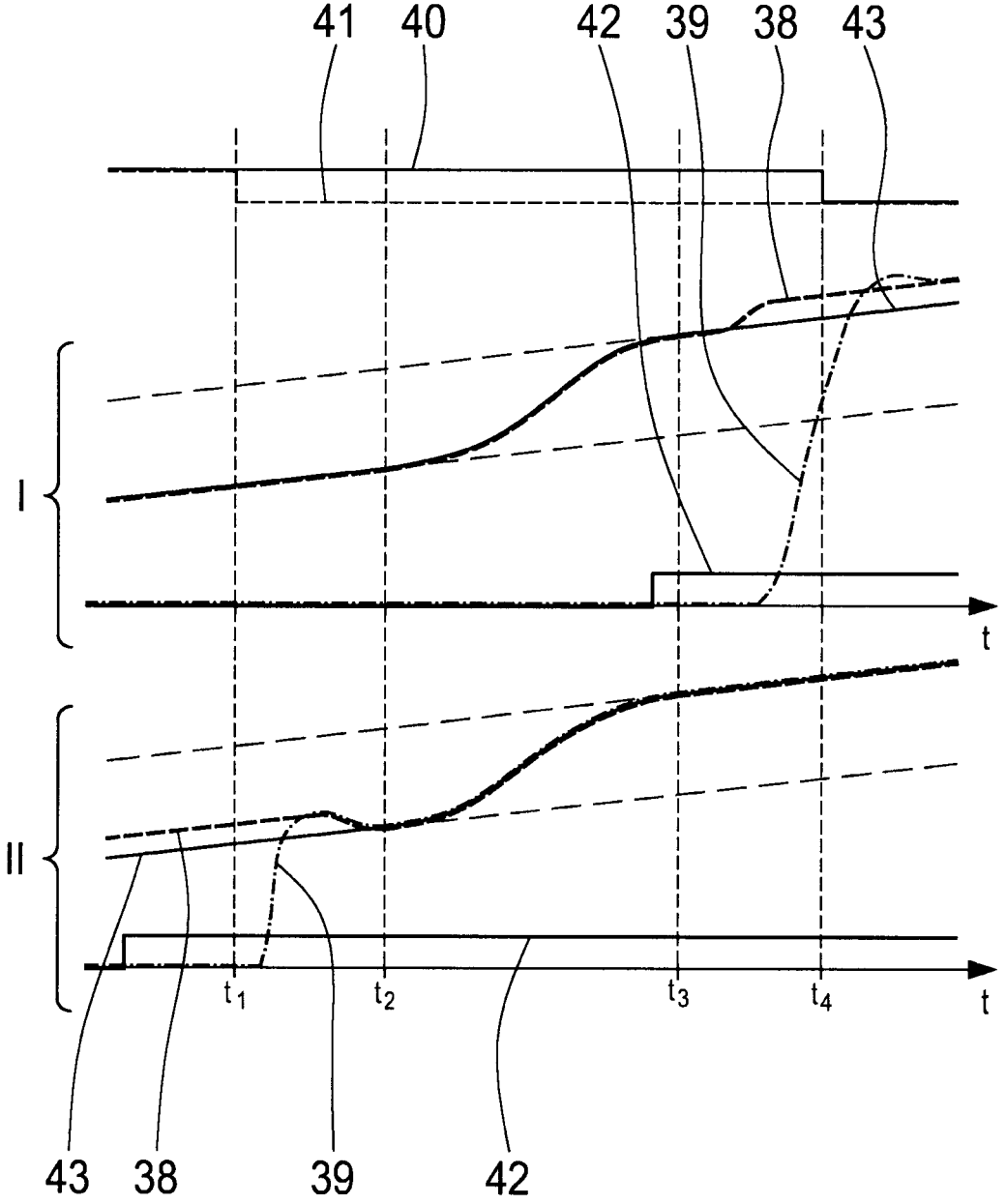
FIG. 16 shows a time-dependency diagram with further rotational speed profiles.
Figure 17:
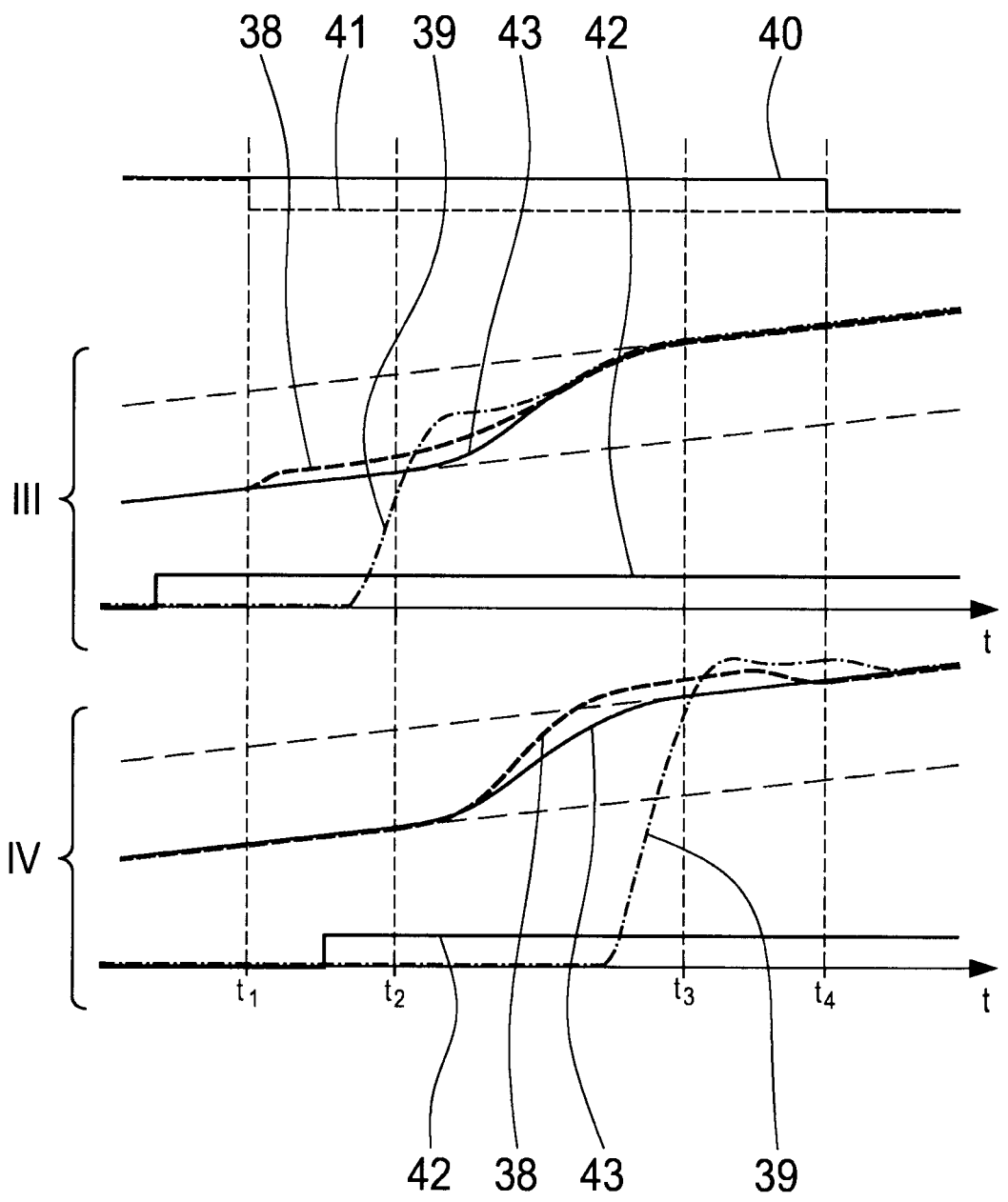
FIG. 17 shows a time-dependency diagram with further rotational speed profiles.

FIGS. 16 and 17 show the curve profiles with respect to time 38, 39, 40, 41, 42, and 43 for the case in which a traction downshift is to be carried out as a gear ratio change in the transmission 5 during drag starting of the internal combustion engine 2 while providing the decoupling of slip for the driven end, wherein FIGS. 16 and 17, similarly to FIGS. 12 and 13, overall, show four cases I, II, III, and IV of developing rotational speed profiles.

The rotational speed profiles 38 show the temporal sequence of the rotational speed of the electric machine 3, the rotational speed profiles 39 each show the temporal sequence of the rotational speed of the internal combustion engine 2, and the rotational speed profiles 43 each show the temporal sequences of the transmission input speed. The curve profile 40 shows the course of a current gear and the curve profile 41 shows the course of a target gear. The curve profile 42 visualizes a control-side request to start the internal combustion engine 2 via drag starting.

In FIGS. 16 and 17, a gear ratio change is started at the point in time t1, wherein the particular gear ratio change is completed at the point in time t4. At the point in time t2, the synchronous speed of the current gear of the gear ratio change to be carried out, namely the traction downshift to be carried out, is exited, whereas, at the point in time t3, the transmission input speed 43 reaches the synchronous speed of the target gear of the traction downshift to be carried out. The so-called slipping phase of the traction downshift to be carried out is therefore present between the points in time t2 and t3.

In the case I, the drag starting of the internal combustion engine 2 is requested immediately before the point in time t3, wherein the gear ratio change to be carried out has already been completed at the point in time t3. Therefore, starting at the point in time t3, the decoupling of slip for the drag starting of the internal combustion engine 2 takes place in the fixed gear of the target gear of the traction downshift to be carried out.

In the case II from FIG. 16, the drag starting of the internal combustion engine 2 is requested according to the signal curve 42 already prior to the point in time t1, i.e., prior to the request for the traction downshift to be carried out, wherein in the case II from FIG. 16, the decoupling of slip for the drag starting of the internal combustion engine 2 can take place in the fixed current gear of the traction downshift to be carried out, since, in the case II from FIG. 16, the drag starting of the internal combustion engine 2 is completed already prior to the point in time t2, i.e., prior to the exiting of the synchronous speed of the current gear of the traction downshift to be carried out.

In the cases III and IV, the decoupling of slip for the drag starting of the internal combustion engine 2 takes place during the implementation of a gear ratio change formed as a traction downshift and, in fact, in the case III by utilizing the shift element 7 of the transmission 5 to be disengaged for the traction downshift and, in the case IV, by utilizing the shift element 7 of the transmission 5 to be engaged for the traction downshift.

Example aspects of the invention also relate to a control unit for operating a hybrid vehicle, which is configured for implementing the above-described example method on the control side. This control unit is, in particular, the transmission control unit 13.

The control unit 13 determines the shift element utilized for the decoupling of slip and a decoupling differential speed therefor depending on whether a starting process of the hybrid vehicle is carried out, and depending on whether the transmission 5 is transferred from a torque-transmitting state into a non-torque-transmitting state or, vice versa, from a non-torque-transmitting state into a torque-transmitting state, and depending on whether a gear ratio change is carried out in the torque-transmitting transmission, and depending on whether the hybrid vehicle includes a hydro-dynamic starting component 8. This takes place in the manner described above.

The control unit 13 determines the decoupling differential speed for the shift element 7, 10 to be utilized for the decoupling of slip depending on a driver demand, and/or depending on an oil temperature, and/or on the gear of the transmission 5 that is utilized for the starting process, or on the gear of the transmission 5 that is engaged in the torque-transmitting state of the transmission 5 or is to be disengaged in order to exit the torque-transmitting state or is to be engaged in order to achieve the torque-transmitting state, or depending on the gear of the transmission 5 that is to be disengaged or engaged during the implementation of the gear ratio change. The control unit 13 determines a decoupling differential speed specific to the particular shift element 7, 10 to be utilized for the decoupling of slip.

The control unit according to example aspects of the invention is an electronic control unit, which includes hardware-related means and software-related means. The hardware-related means include data interfaces for exchanging data with the assemblies contributing to the implementation of the method according to example aspects of the invention, such as with the hybrid control unit 16, which provides rotational speeds of the internal combustion engine 2 and the electric machine 3, and with the separating clutch 4 and the transmission 5. The hardware-related means also include a processor for data processing and a memory for data storage. The software-related means include program modules, which are implemented in the control unit in order to implement the method according to example aspects of the invention on the control side.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 drive train
2 internal combustion engine
3 electric machine
4 separating clutch 5 transmission
5a transmission input
5b transmission output
6 driven end
7 shift element
8 hydrodynamic starting component
9 torque converter
10 torque converter lockup clutch
11 turbine wheel
12 impeller
13 transmission control unit
14 internal combustion engine control unit
15 electric machine control unit
16 hybrid control unit
17 start block
18 block
19 end block
20 block
21 block
21a start block
21b block
21c block
21d end block
22 block
23 block
24 block
25 block
25a start block
25b end block
25c block
25d block
25e block
25f block
26 block
27 block
28 block
28a start block
28b block
28c end block
28d block
28e block
28f block
28g block
28h block
29 block
29a start block
29b block
29c end block
29d block
29e block
29f block
29g block
29h block
30 rotational speed profile of electric machine
31 rotational speed profile of internal combustion engine
32a start block
32b block
32c block
32d block
32e block
32f block
32h block
32j block
32l block
32x block
32y block
32z block 33a block
33b block
33c block
34 pressure profile
35 pressure profile
36a block
36b block
36c block
36d block
36f block
36i block
36j block
36k block
37a block
37b block
37c block
38 rotational speed profile of electric machine
39 rotational speed profile of internal combustion engine
40 current gear
41 target gear
42 request for drag starting of internal combustion engine
43 rotational speed profile of transmission input speed

The invention claimed is:

1. A method for operating a hybrid vehicle that includes an electric machine (3) as a first prime mover, an internal combustion engine (2) as a second prime mover, a separating clutch (4) connected between the internal combustion engine (2) and the electric machine (3), and a transmission (5) connected between the electric machine (3) and a driven end (6), the transmission (5) including a plurality of shift elements (7), the hybrid vehicle optionally including a hydrodynamic starting component (8) connected between the electric machine (3) and the transmission (5) and including a torque converter (9) and a shift element configured as a torque converter lockup clutch (10), the separating clutch (4) being disengaged during a purely electric driving mode of the hybrid vehicle, the separating clutch (4) being engaged during hybrid travel or driving under internal combustion engine power, the method comprising:

to start the internal combustion engine (2) during the purely electric driving mode of the hybrid vehicle, at least partially engaging the separating clutch (4) in order to crank the internal combustion engine (2) via the electric machine (3);

determining one of the shift elements (7, 10) arranged between the electric machine (3) and the driven end (6) to be utilized for decoupling of slip of the internal combustion engine start and a decoupling differential speed for the one of the shift elements (7, 10) depending on whether a starting process of the hybrid vehicle is carried out, the driven end (6) of the hybrid vehicle being configured to assume a rotational speed during the starting process, the transmission (5) is transferred from a torque-transmitting state into a non-torque-transmitting state or, vice versa, from a non-torque-transmitting state into a torque-transmitting state, a gear ratio change is carried out in the transmission (5), and the hybrid vehicle includes the hydrodynamic starting component (8); and bringing the one of the shift elements (7, 10) arranged between the electric machine (3) and the driven end (6) into slippage for decoupling of slip of the driven end (6) with the decoupling differential speed in order to limit interference torque at the driven end.

2. The method of claim 1, wherein determining the decoupling differential speed for the one of the shift elements (7, 10) comprises determining the decoupling differential speed depending on one or more of:

a target drive torque of the hybrid vehicle;

an oil temperature;

the gear of the transmission (5) utilized for the starting process;

the gear of the transmission (5) engaged in the torque-transmitting state of the transmission (5) or is to be disengaged in order to exit the torque-transmitting state or is to be engaged in order to achieve the torque-transmitting state;

the gear of the transmission (5) to be disengaged or engaged during the implementation of the gear ratio change;

a mass inertia of shafts of the transmission (5), which are to be accelerated for the decoupling of slip of the driven end (6);

the one of the shift elements (7, 10) determined for the decoupling of slip;

a friction lining temperature of the one of the shift elements (7, 10) determined for the decoupling of slip; and present dynamic characteristics of the vehicle open-loop control.

3. The method of claim 1, wherein the decoupling differential speed specific for the one of the shift elements (7, 10) to be utilized for the decoupling of slip is determined.

4. The method of claim 1, further comprising, when a starting process of the hybrid vehicle is carried out, for the decoupling of slip:

determining one of the shift elements (7, 10) to be engaged during the starting process; and adapting a target starting speed depending on the decoupling differential speed.

5. The method of claim 1, further comprising, when, in the torque-transmitting state of the transmission (5), a gear is engaged and a gear ratio change and a transfer of the transmission (5) from the torque-transmitting state into a non-torque-transmitting state are not carried out:

determining that the torque converter lockup clutch (10) is the one of the shift elements (7, 10) for the decoupling of slip when the hybrid vehicle includes the hydrodynamic starting component (8); or determining that one of the plurality of shift elements (7) is the one of the shift elements (7, 10) for the decoupling of slip when the hybrid vehicle does not include the hydrodynamic starting component (8).

6. The method of claim 1, further comprising, when the transmission (5) is transferred from a non-torque-transmitting state into a torque-transmitting state for the purpose of decoupling slip of the internal combustion engine start:

initially determining one of the plurality of shift elements (7) of the transmission (5) to be first engaged; and thereafter determining one of the plurality of shift elements (7) of the transmission (5) for the decoupling of slip is the one that is determined for the decoupling of slip in the torque-transmitting state of the transmission (5) with a fixedly engaged gear.

7. The method of claim 1, further comprising, when the transmission (5) is transferred from a torque-transmitting state into a non-torque-transmitting state, determining the one of the plurality of shift elements (7) of the transmission (5) to be disengaged first for the decoupling of slip.

8. The method of claim 1, further comprising, when a gear ratio change is carried out in the torque-transmitting transmission (5), checking whether a speed differential between a synchronous speed of a target gear of the gear ratio change and a current transmission input speed is greater than the decoupling differential speed (block 28*d*), wherein, when the speed differential is greater than the decoupling differential speed, the decoupling of slip of the internal combustion engine start takes place in a slipping phase of the gear ratio change, wherein, when the speed differential is not greater than the decoupling differential speed and the gear ratio change to be carried out occurs prior to exiting the synchronous speed of the current gear of the gear ratio change, the torque converter lockup clutch (10), if present, or one of the plurality of shift elements (7) of the transmission (5) to be disengaged for the gear ratio change is determined for the decoupling of slip;

wherein, when the speed differential is not greater than the decoupling differential speed and the gear ratio change to be carried out occurs after exiting the synchronous speed of the current gear of the gear ratio change, the torque converter lockup clutch (10) is determined (block 28*h*, 36*c*) for the decoupling of slip of the internal combustion engine start if the hybrid vehicle includes the hydrodynamic starting component (8), or one of the plurality of shift elements (7) of the transmission (5) to be engaged for the gear ratio change is determined (block 36*e*) for the decoupling of slip of the internal combustion engine start if the hybrid vehicle does not include the hydrodynamic starting component (8), and, when the one of the plurality of shift elements (7) of the transmission (5) does not coincide with the shift element utilized for the decoupling of slip of the internal combustion engine start in the fixed gear, a transfer function (block 36*l*) is used to change to the shift element utilized for the decoupling of slip of the internal combustion engine start in the fixed gear.

9. A control unit (13), wherein the control unit (13) is configured for carrying out the method of claim 1 on a control side.

10. A control unit (13) for operating a hybrid vehicle that includes an electric machine (3) as a first prime mover, an internal combustion engine (2) as a second prime mover, a separating clutch (4) connected between the internal combustion engine (2) and the electric machine (3), and a transmission (5) connected between the electric machine (3) and a driven end (6), the transmission (5) including a plurality of shift elements (7), the hybrid vehicle optionally including a hydrodynamic starting component (8) connected between the electric machine (3) and the transmission (5) and including a torque converter (9) and a shift element configured as a torque converter lockup clutch (10), the separating clutch (4) being disengaged during a purely electric driving mode of the hybrid vehicle, the separating clutch (4) being engaged during hybrid travel or driving under internal combustion engine power, wherein the control unit (13) is configured to:

determine one of the shift elements (7, 10) arranged between the electric machine (3) and the driven end (6) to be utilized for decoupling of slip of the internal combustion engine start and a decoupling differential speed depending on whether a starting process of the hybrid vehicle is carried out, the driven end (6) of the hybrid vehicle being configured to assume a rotational speed during the starting process, whether the transmission (5) is transferred from a torque-transmitting state into a non-torque-transmitting state or, vice versa, from a non-torque-transmit-
ting state into a torque-transmitting state, whether a gear ratio change is carried out in the
torque-transmitting transmission (5), and whether the hybrid vehicle includes the hydrodynamic
starting component (8); and bring the one of the shift elements (7, 10) arranged
between the electric machine (3) and the driven end (6)
into slippage for decoupling of slip of the driven end (6)
with the decoupling differential speed in order to limit
interference torque at the driven end.

\* \* \* \* \*